(12) United States Patent
Shishido et al.

(10) Patent No.: US 7,423,952 B2
(45) Date of Patent: Sep. 9, 2008

(54) RECORDING MEDIUM, RECORDING APPARATUS AND RECORDING METHOD

(75) Inventors: Yukio Shishido, Kanagawa (JP); Tetsuji Kawashima, Kanagawa (JP); Hiro Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 582 days.

(21) Appl. No.: 10/834,996

(22) Filed: Apr. 30, 2004

(65) Prior Publication Data

US 2004/0264322 A1    Dec. 30, 2004

(30) Foreign Application Priority Data

May 12, 2003  (JP) ............................. 2003-132738
Aug. 18, 2003  (JP) ............................. 2003-294262

(51) Int. Cl.
    *G11B 3/74* (2006.01)
(52) U.S. Cl. ....................................................... 369/94
(58) Field of Classification Search ........................ None
    See application file for complete search history.

(56) References Cited

U.S. PATENT DOCUMENTS

| | | | |
|---|---|---|---|
| 5,881,032 A * | 3/1999 | Ito et al. ......................... | 369/94 |
| 5,966,721 A * | 10/1999 | Hirayama et al. ............ | 711/112 |
| 6,072,759 A * | 6/2000 | Maeda et al. ............. | 369/59.25 |
| 6,370,091 B1 * | 4/2002 | Kuroda ........................ | 369/94 |
| 6,424,614 B1 * | 7/2002 | Kawamura et al. ........ | 369/275.3 |
| 6,801,494 B2 * | 10/2004 | Ross ......................... | 369/275.3 |
| 7,184,377 B2 * | 2/2007 | Ito et al. .................. | 369/47.14 |
| 2003/0081535 A1 | 5/2003 | Ross | |

FOREIGN PATENT DOCUMENTS

EP        0 715 301        6/1996

(Continued)

OTHER PUBLICATIONS

"Standard ECMA-267, 3rd Edition: 120 mm DVD-Read-Only Disk", ECMA. Standardizing Information and Communication Systems, No. 272, XP-002186785, Apr. 2001, pp. 1-85.

*Primary Examiner*—Thang V. Tran
(74) *Attorney, Agent, or Firm*—Oblon, Spivak, McClelland, Maier & Neustadt, P.C.

(57) ABSTRACT

A recording medium of the recordable type in the form of a multi-layer disc or the like which is improved in compatibility and feasibility in use and a recording apparatus and a recording method ready for the recording medium are disclosed. A region for recording interlayer folding back position information is set on the recording medium (for example, "End sector number in Layer 0" or a session item type 3). In response to a fact that recording on a certain recording layer reaches a maximum recording range or that data recording advances from a certain recording layer to a next recording layer, interlayer folding back position information is recorded on the recording medium. This signifies that such recording is performed when advancement of the data recording to another recording layer is performed at a stage prior to disc closing or session closing or when it is predicted that such advancement of the data recording occurs soon. Also where the disc is of the type for which multi-session recording is performed, interlayer folding back position information is recorded with regard to a session in which folding back is performed.

12 Claims, 18 Drawing Sheets

FOREIGN PATENT DOCUMENTS

| | | |
|---|---|---|
| EP | 0 817 195 | 1/1998 |
| EP | 0 890 948 | 1/1999 |
| JP | 08-212561 | 8/1996 |
| JP | 10-021673 | 1/1998 |
| JP | 11-031357 | 2/1999 |
| JP | 2002-279626 | 9/2000 |
| JP | 2004-310972 | 11/2004 |
| JP | 2004-310996 | 11/2004 |
| JP | 2006-040531 | 2/2006 |
| JP | 2007-012278 | 1/2007 |

* cited by examiner

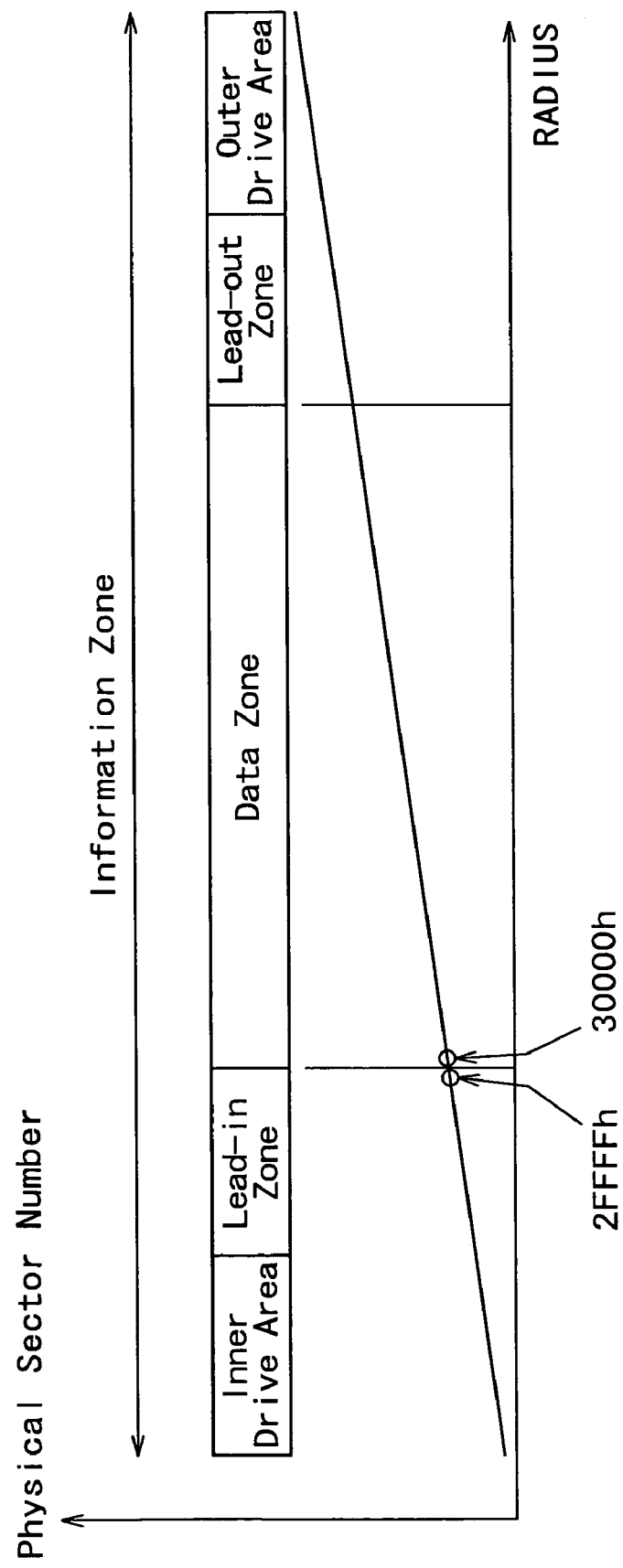

FIG. 2

Layout of the Information Zone of a Multi-Session Disc

| Session | Zone | | Description | Number of Physical Sectors |
|---|---|---|---|---|
| | Inner Drive Area | | — | — |
| Session1 | Lead-In | | ... | ... |
| | | | Reserved Zone 2 | 64 |
| | | | Inner Disc Identification Zone | 256 |
| | | | ... | ... |
| | | | Control Data Zone | 3072 |
| | | | Buffer Zone 2 | 512 |
| | Data | | Data Zone | Min. 16 |
| | Closure | | Buffer Zone C | 768 |
| | | | Outer Session Identification Zone | 256 |
| Session2 | Intro | | Buffer Zone A | 64 |
| | | | Inner Session Identification Zone | 256 |
| | | | Session Control Data Zone | 640 |
| | | | Buffer Zone B | 64 |
| | Data | | Data Zone | Min. 16 |
| | Closure | | Buffer Zone C | 768 |
| | | | Outer Session Identification Zone | 256 |
| ... | ... | | ... | ... |
| SessionN (N≤191) | Intro | | ... | ... |
| | Data | | Data Zone | Min. 16 |
| | | | Buffer Zone 3 | 768 |
| | Lead-out | | Outer Disc Identification Zone | 256 |
| | | | ... | ... |
| | Outer Drive Area | | — | — |

FIG. 3

General Format of each Disc Control Block

| Physical Sector of each DCB | Main Data byte position | Description |
|---|---|---|
| 0 | D0 to D3 | Content Descriptor |
| 0 | D4 to D7 | Unknown Content Descriptor Actions |
| 0 | D8 to D39 | Drive ID |
| 0 | D40 to D2047 | Content Descriptor Specific |
| 1 to 15 | D0 to D2047 | Content Descriptor Specific |

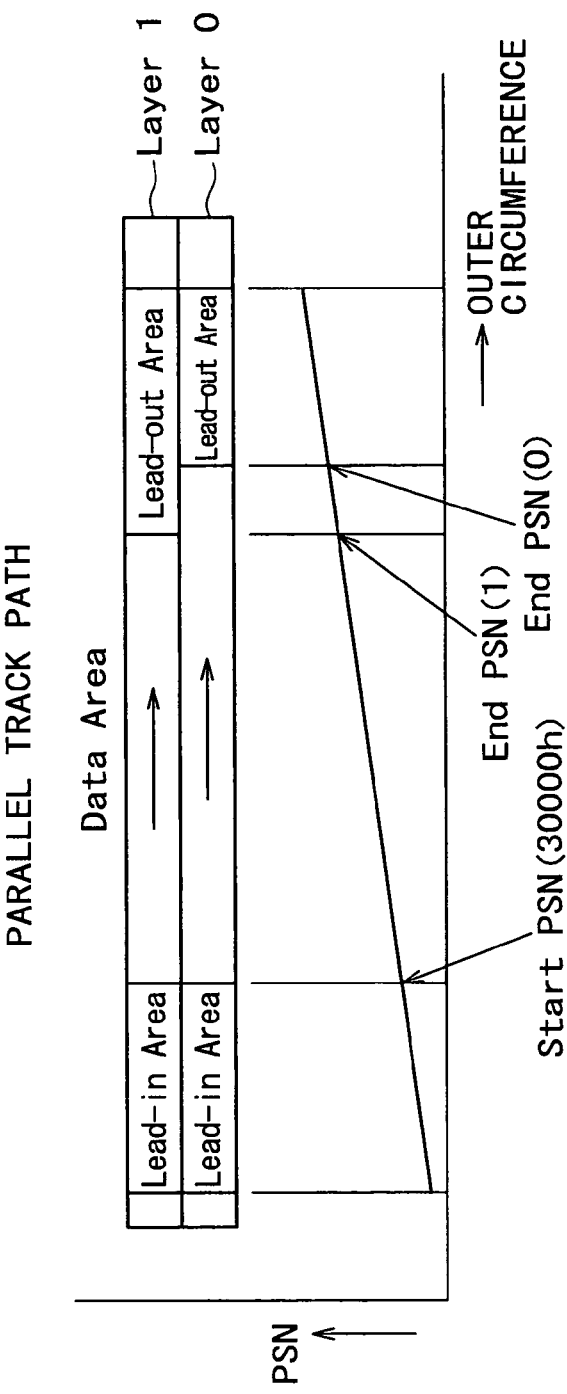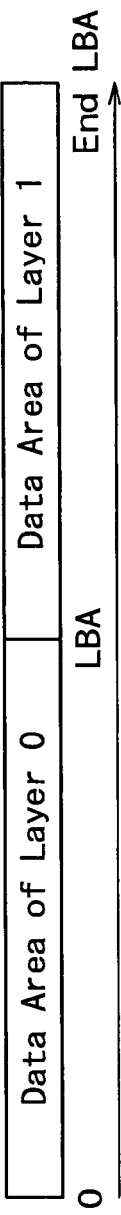
FIG. 5A
FIG. 5B

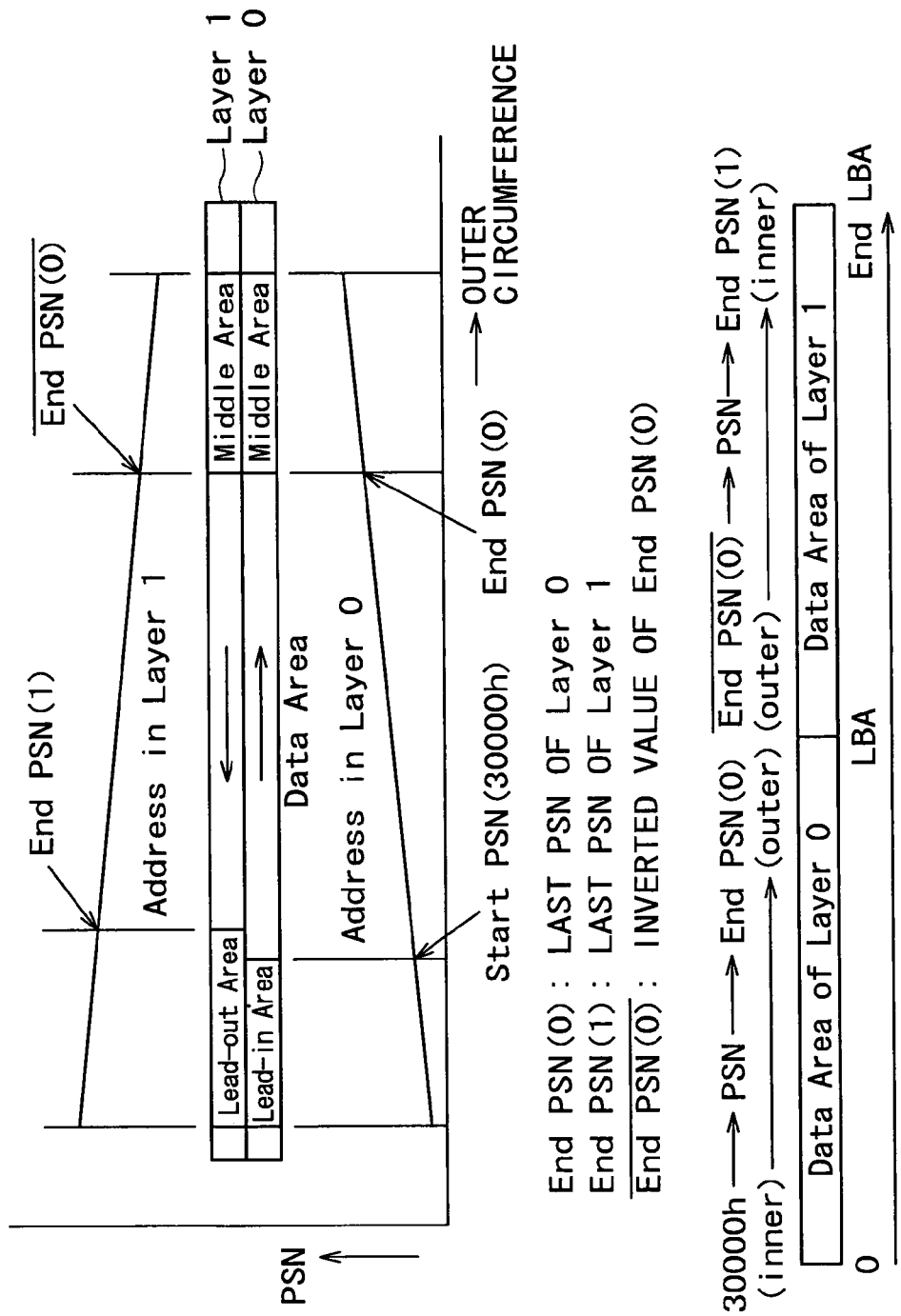

FIG. 7

Physical Format Information

| Byte position | Contents | Number of bytes |
|---|---|---|
| 0 | Book Type and Part version | 1byte |
| 1 | Disc size and minimum read-out rate | 1byte |
| 2 | Disc structure | 1byte |
| 3 | Recorded density | 1byte |
| 4 to 15 | *Data Area Allocation* | 12bytes |
| 16 | BCA descriptor | 1byte |
| 17 to 31 | Reserved | 15bytes |
| 32 to 2047 | Reserved | 2016bytes |

FIG. 8

Data Area Allocation Field

| Byte position | Single Layer | Parallel track path | Opposite track path |
|---|---|---|---|
| 4 | 00h | | |
| 5 to 7 | Start sector number of the Data Area (030000h) | | |
| 8 | 00h | | |
| 9 to 11 | End sector number of the Data Area | | |
| 12 | 00h | | |
| 13 to 15 | 000000h | | *End sector number in Layer 0* |

F I G. 9A

Layer 1: UA, UA, UA, UA, UA, UA, UA, UA, UA, DA12, DA11, MA1, UA
Layer 0: UA, UA, DA1, DA2, DA3, DA4, DA5, DA6, DA7, DA8, DA9, DA10, MA0, UA

F I G. 9B

Layer 1: UA, UA, L01, L01, L01, L01, L01, L01, L01, DA12, DA11, MA1, UA
Layer 0: UA, L10, DA1, DA2, DA3, DA4, DA5, DA6, DA7, DA8, DA9, DA10, MA0, UA

FIG. 11

Format of the SDCB

| Physical Sector of ECC block | Main Data byte position | Description |
|---|---|---|
| 0 | D0 to D3 | Content Descriptor (53444300) |
| 0 | D4 to D7 | Unknown Content Descriptor Actions |
| 0 | D8 to D39 | Drive ID |
| 0 | D40 to D41 | Session Number |
| 0 | D42 to D45 | End sector number in Layer 0 |
| 0 | D46 to D63 | Reserved and set to (00) |
| 0 | D64 to D95 | Disc ID (in Lead-in Zone Only) |
| 0 | D96 to D127 | Application Dependent |
| 0 | D128 to D143 | Session Item 0 |
| 0 | ⋮ | ⋮ |
| 0 | (D128+l*16) to (D143+l*16) | Session Item l |
| 0 | ⋮ | ⋮ |
| 0 | D128+(N-1)*16 to D143+(N-1)*16 | Session Item N-1 |
| 0 | D128+N*16 to D2047 | Reserved and set to (00) |
| 1 to 3 | D0 to D2047 | Extension for Session Items Or Reserved and set to (00) |
| 4 to 7 | D0 to D2047 | Repetition for Sectors 0 to 3 (recommended) Or Reserved and set to (00) |
| 8 to 11 | D0 to D2047 | Repetition for Sectors 0 to 3 (recommended) Or Reserved and set to (00) |
| 12 to 15 | D0 to D2047 | Repetition for Sectors 0 to 3 (recommended) Or Reserved and set to (00) |

FIG. 12A

TYPES OF SESSION ITEM

| TYPE 1 | FRAGMENT ITEM | FRAGMENT INFORMATION |
| --- | --- | --- |
| TYPE 2 | PREVIOUS SESSION ITEM | INFORMATION OF SESSION PRECEDING TO CURRENT SESSION |
| TYPE 3 | LAYER ITEM | INTERLAYER FOLDING BACK POSITION INFORMATION |

FIG. 12B

TYPE 1: FRAGMENT ITEM

| BYTE POSITION | CONTENT | BYTE NUMBER |
| --- | --- | --- |
| 0~2 | Fragment Item Descriptor | 3 |
| 3~4 | Fragment Number | 2 |
| 5~7 | Fragment Start Address | 3 |
| 8~10 | Fragment End Address | 3 |
| 11~15 | Reserved | 5 |

FIG. 12C

TYPE 3: LAYER ITEM

| BYTE POSITION | CONTENT | BYTE NUMBER |
| --- | --- | --- |
| 0~2 | Layer Item Descriptor | 3 |
| 3~4 | Layer Number | 2 |
| 5~7 | Reserved | 3 |
| 8~10 | Layer End Address | 3 |
| 11~15 | Reserved | 5 |

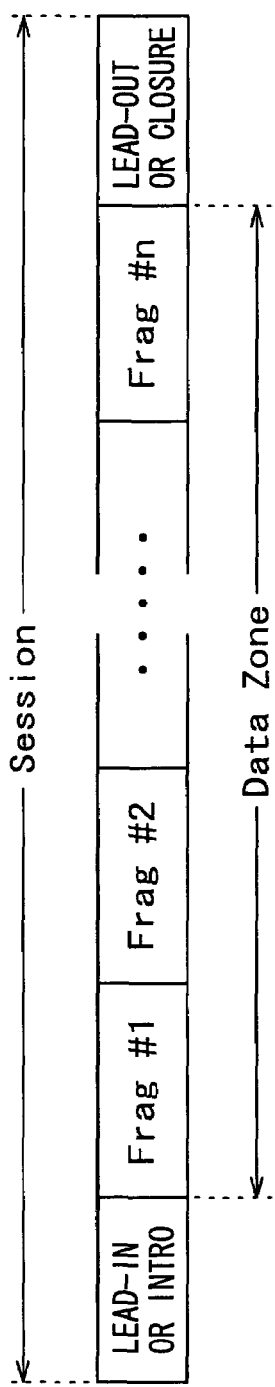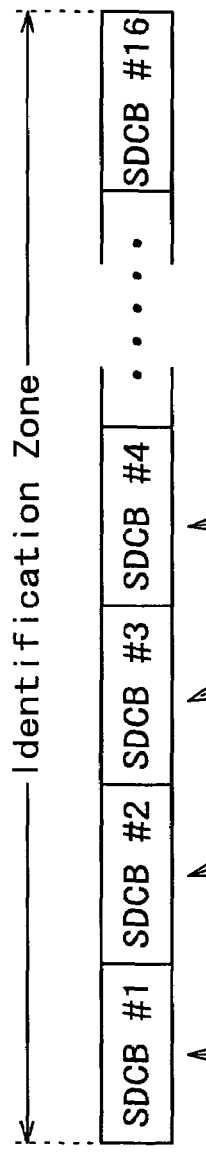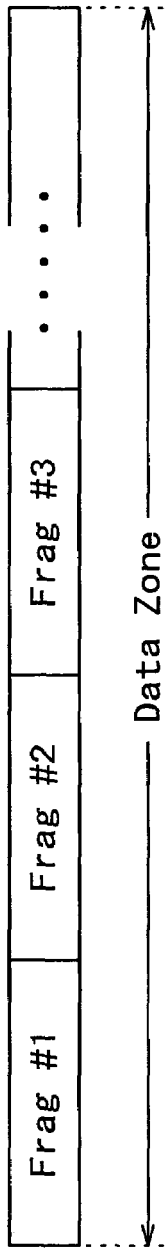
F I G. 1 3 A
F I G. 1 3 B
F I G. 1 3 C

RECORDING MEDIUM, RECORDING APPARATUS AND RECORDING METHOD

BACKGROUND OF THE INVENTION

This invention relates to a recording medium which includes a plurality of information recording layers and a recording apparatus and a recording method ready for a recording medium of the type mentioned.

Optical discs, optical cards and so forth are known as optical recording media on or from which information can be recorded or reproduced optically. A laser beam of a semiconductor laser or a like element is used as a light source and converged by a lens to form a light spot which is illuminated upon an optical recording medium of the type mentioned to record or reproduce information on or from the optical recording medium.

Development of a technique for further increasing the recording capacity of such optical recording media as described above has been and is being carried out energetically. Conventional effects to increase the information recording density on an optical disc have been directed principally to increase of the recording density on a recording surface of the disc. For example, it has been attempted to reduce the track pitch and/or raise the recording density in a linear velocity direction in recording and reading scanning, for example, in combination with a decrease in wavelength of a light source for emitting a recording beam or with signal processing of a reproduction system.

However, even if the wavelength of the light source is reduced, it is limited down to the ultraviolet region. Meanwhile, the pit size can be reduced to a level with which the pit can be transferred to a disc upon cutting. Therefore, as far as a two-dimensional region of a disc is utilized, the attempts to raise the recording density are limited soon.

Therefore, also a technique which makes use of a three-dimensional region is attempted to increase the capacity of a disc. In particular, attention is paid to a multi-layer disc wherein a plurality of information recording layers are layered in order to further increase the recording information density in the thicknesswise direction of a disc.

A multi-layer recording medium in which a plurality of recording layers are layered is characterized in that it can have a recording capacity increased in accordance with the number of recording layers and can be combined readily with other high density recording techniques. As one of such multi-layer recording discs, for example, a DVD-ROM (Digital Versatile Disc ROM) which is a reproduction-only optical disc has been placed into practical use.

Several documents such as U.S. Pat. Nos. 5,740,136, 5,754,507, 5,682,372, 5,920,527, 6,061,310, 6,330,212 and 6,552,971 disclose techniques applied to a DVD-ROM or the like which includes two recording layers.

It is expected that not only multi-layer media of the ROM type but also recordable multi-layer recording media wherein a plurality of recording layers of a phase change material, a magneto-optical material or a dye material are layered can be placed into practical use in future. For example, as regards discs of the DVD type, it is estimated that multi-layer recording layers are implemented also with discs of the write-once type called DVD-R or DVD+R and discs of the rewritable type called DVD-RW or DVD+RW.

Incidentally, where a recording operation is performed for a multi-layer recording medium, movement of the recording point between layers is performed in the recording process. For example, the recording layers of a two-layer disc are possibly used in such a form that data recording is performed first for the first layer (layer 0) and then data recording is performed for the second layer (layer 1).

Where the multi-layer recording medium is a reproduction-only disc such as a DVD-ROM described above, since the amount of data recorded on the disc in advance is known and no user data are written on the disc any more, the folding back position of the reading point in movement between layers is fixed, and the folding back position may be recorded, for example, in management information in the lead-in area. More particularly, information of the last end position of the layer 0 may be recorded.

However, where discs which allow recording such as write-once type discs or rewritable type discs are considered, only if information of a fixed folding back position is recorded merely in the lead-in area or the like, this is insufficient for practical use.

For example, in a recordable disc, information of the lead-in area and so forth is not finally determined until after the entire disc is closed (or finalized) after data recording. In this instance, the folding back position information is not recorded until after disc closing is performed.

Further, when additional writing is performed in a multi-session system, since information of the lead-in area is written upon closing of the first session, actual folding back position information is not reflected. For example, if recording of the second session is performed after the first session is closed and the second session extends from the layer 0 to the layer 1, the actual folding back position information is not recorded as information of the lead-in area.

The situations described above give rise to a problem that such a situation that a disc recording and reproduction apparatus cannot actually grasp the folding back position accurately occurs and this deteriorates the compatibility and the feasibility in use of the disc.

SUMMARY OF THE INVENTION

It is an object of the present invention to provide a recording medium of the recordable type having a plurality of recording layers which allows folding back position information to be managed accurately to assure the compatibility and the feasibility in use of the disc and a recording apparatus and a recording method which are ready by which folding back position information of a recording medium of the type described can be managed accurately.

In order to attain the object described above, according to an aspect of the present invention, there is provided a recording medium, including a plurality of recording layers into which data can be written, each of the recording layers having formed thereon a data area into and from which main data are to be recorded and reproduced, a preceding area formed at a position preceding to the data area, and an end area succeeding the data area, the recording medium having a region into which, in response to a fact that recording on a certain one of the recording layers reaches a maximum recording range or that data recording advances from a certain one of the recording layers to a next one of the recording layers, interlayer folding back position information indicative of a position to which the data recording advances is to be recorded.

According to another aspect of the present invention, there is provided a recording apparatus for a recording medium which has a plurality of recording layers into which data can be written and each of which has a data area into and from which main data are to be recorded and reproduced, a preceding area formed at a position preceding to the data area, and an end area succeeding the data area, including a recording block for recording information on any of the recording layers, and a control block for controlling, when, in a recording operation by the recording block, recording on a certain one of the recording layers reaches a maximum recording range or data recording advances from a certain one of the recording layers to a next one of the recording layers, the recording block to record interlayer folding back position information indicative of a position to which the data recording advances into a predetermined region on the recording medium.

According to a further aspect of the present invention, there is provided a recording method for recording on a recording medium which has a plurality of recording layers into which data can be written and each of which has a data area into and from which main data are to be recorded and reproduced, a preceding area formed at a position preceding to the data area, and an end area succeeding the data area, including a step of recording information on any of the recording layers, and a step of controlling, in response to a fact that recording on a certain one of the recording layers reaches a maximum recording range or data recording advances from a certain one of the recording layers to a next one of the recording layers at the recording step, so that interlayer folding back position information indicative of a position to which the data recording advances is recorded into a predetermined region on the recording medium.

In the recording medium, recording apparatus and recording method, interlayer folding back position information is recorded into the predetermined region on the recording medium in response to a fact that recording on a certain one of the recording layers reaches a maximum recording range or that data recording advances from a certain one of the recording layers to a next one of the recording layers. This signifies that interlayer folding back position information is recorded when advancement of the data recording to another recording layer is performed at a stage before disc closing or session closing is performed or when it is predicted that such advancement of the data recording occurs soon. Accordingly, the recording apparatus or a reproduction apparatus can grasp the interlayer folding back position information of the disc even if the disc is in a stage before disc closing or session closing is performed for the disc.

Further, where the disc is of the type for which multi-session recording is performed, when interlayer folding back occurs or when a session is closed, correct interlayer folding back position information in the session is recorded on the disc. Also in this instance, the recording apparatus or a reproduction apparatus can grasp the correct interlayer folding back position information of the disc.

Accordingly, the recording apparatus and the reproduction apparatus can correctly grasp the interlayer folding back position information of the disc even if the disc at a stage before disc closing or session closing is performed for the disc or the disc is of the type for which multi-session recording is performed. Consequently, there is an advantage that the compatibility and the feasibility in use of a recording and/or reproduction system in which a recording medium is used can be improved.

More particularly, even if the disc recorded by a certain recording apparatus is not closed, it can be recorded using another recording apparatus as well. Further, even if the disc recorded by a certain recording apparatus is of the multi-session type, it can be recorded or reproduced well using another recording apparatus or another reproduction apparatus as well. Also the feasibility in use of the user is improved thereby.

Where the region into which the interlayer folding back position information is to be recoded is provided in the data area, particularly, for example, in a region of an intro or a closure which are provided as front and rear ends of a session in the data area, the interlayer folding back position information can be recorded and confirmed readily in a unit of a session. Further, in a session whose portion corresponding to the intro is a preceding area, the interlayer folding back position information may be recorded in the preceding area which may be, for example, a lead-in area or a middle area, but in another session whose portion corresponding to the closure is an end area, the interlayer folding back position information may be recorded in the end area which may be, for example, a lead-out area or a middle area.

Further, if advancement of the data recording from a certain one of the recording layers to a next one of the recording layers is performed within a certain session, then it is appropriate to record the interlayer folding back position information when the session is closed, and this makes it possible to accurately record the interlayer folding back position information on the disc particularly of the multi-session type.

Furthermore, when the recording medium is to be unloaded, if advancement of the data recording from a certain one of the recording layers to a next one of the recording layers is performed within a session on the recording medium which is not closed as yet and recording of the interlayer folding back position information is executed, recording of the interlayer folding back position information can be implemented appropriately with the disc before it is closed.

This similarly applies also where recording of the interlayer folding back position information is performed in response to an instruction from a host apparatus.

Further, if the interlayer folding back position information is recorded when advancement of the data recording by a recording operation from a certain one of the recording layers to a next one of the recording layers is performed, then when an event of interlayer folding back occurs, the interlayer folding back position information in this instance is assured immediately on the recording medium. Therefore, even if, for example, interruption of power supply or the like occurs later, the correct interlayer folding back position information can be obtained.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a diagrammatic view illustrating an area structure and PSN of a disc;

FIG. 2 is a view illustrating an information zone of a multi-session disc;

FIG. 3 is a view illustrating a disc control block;

FIGS. 5A and 5B are diagrammatic views illustrating a parallel track path;

FIGS. 6A and 6B are diagrammatic views illustrating an opposite track path;

FIG. 7 is a view illustrating physical format information;

FIG. 8 is a view illustrating a data area allocation field;

FIGS. 9A and 9B are views illustrating recorded states on an opposite track path;

FIG. 11 is a view illustrating an SDCB of a disc of to which the present invention is applied;

FIGS. 12A to 12C are views illustrating session items on the disc illustrated in FIG. 11;

FIGS. 13A to 13C are views illustrating fragment recording and SDCB updating within a session;

DESCRIPTION OF THE PREFERRED EMBODIMENT

Figure 4:
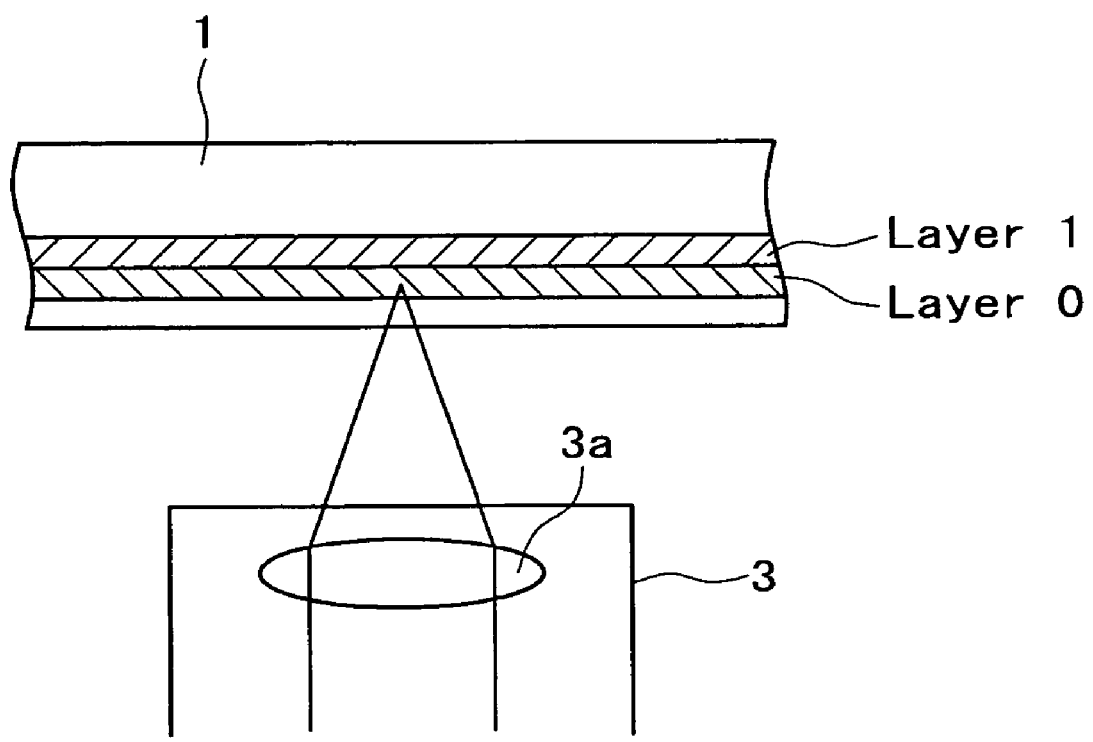
FIG. 4 is a schematic view showing a two-layer disc.

In the following, a preferred embodiment of the present invention is described in the following procedure.
1. Disc
1-1. Area Structure of a Recording Layer
1-2. Two-Layer Disc
1-3. Example I of Recording of Interlayer Folding Back Position Information
1-4. Example II of Recording of Interlayer Folding Back Position Information
2. Disc Drive Apparatus
2-1. Apparatus Configuration
2-2. Session Closing Process
2-3. Processing upon Ejection
2-4. SDCB Updating Process upon Occurrence of Interlayer Folding Back
3. Modifications 1. Disc 1-1. Area Structure of a Recording Layer In a preferred embodiment of the present invention, a DVD (Digital Versatile Disc) is taken as an example of a large capacity disc recording medium, and a disc drive apparatus hereinafter described performs recording and reproduction of a disc in the form of a DVD.

A plurality of standards such as DVD+R, DVD-R, DVD-RW and DVD-RAM are available for discs of the DVD type which allow recording. In the following description of the present specification, a DVD+R which is a write-once medium is taken as an example.

If a disc in the form of a DVD+R is loaded into a disc drive apparatus (recording apparatus), then information unique to the disc is read out from ADIP (Address in pre-groove) information engraved on a wobbling groove on a recording surface of the disc, and it is recognized that the disc loaded is a DVD+R disc. The recognized disc is recorded and then unloaded from the recording apparatus soon, and may thereafter be loaded again. In this instance, the disc may be loaded into the same recording apparatus again or may otherwise be loaded into some other recording apparatus or reproduction apparatus for data exchange.

Taking such forms of use into consideration, a logical format of the DVD is prescribed in order to make smooth recording exchange and reproduction exchange between apparatus.

FIG. 1 shows a layout of a recording layer of the DVD+R.

Referring to FIG. 1, in a logical data layout in the recording layer of the DVD+R, an information zone is formed from the inner circumference side to the outer circumference side of the disc. The information zone is a region which includes all necessary information to secure recording exchange and reproduction exchange of data.

The information zone includes one or a plurality of sessions.

The information zone is principally composed of the following five areas.
[1] Inner drive area
[2] Lead-in zone (also called lead-in area)
[3] Data zone (also called data area)
[4] Lead-out zone (also called lead-out area)
[5] Outer drive area The lead-in zone, data zone and lead-out zone are regions which can be accessed without any trouble also by an apparatus for exclusive use for reproduction.

The inner drive area and the outer drive area are regions for exclusive use for a recording apparatus. When information is to be recorded, the laser power upon recording must be adjusted so that correct recording marks can be formed. To this end, a test zone which can be used for test recording for determining optimum recording conditions and a region into which management information regarding recording conditions can be recorded are formed in the inner drive area and the outer drive area. Since the recorded state of the test zone is rendered ununiform by test recording, there is no guarantee that the test zone can be accessed without any trouble by an apparatus for exclusive use for reproduction, and therefore, the test zone is disposed at a position at which it cannot be accessed by an apparatus for exclusive use for reproduction.

A physical sector number (PSN) is applied as information of an absolute position on the disc.

As seen in FIG. 1, the value of the physical sector number increases, for example, from the inner circumference side to the outer circumference side of the disc. In the DVD+R, PSN=2FFFFh (any value with h added thereto is represented in hexadecimal notation) is determined as the last end of the lead-in zone, and the data zone starts from PSN=30000h.

The data zone basically is a region into which user data are written whereas management information is written in the lead-in zone. On the other hand, the lead-out zone is subject to writing of dummy data in order to maintain the compatibility with, for example, a reproduction-only disc, but sometimes undergoes writing of management information.

In order to maintain the compatibility with a reproduction-only disc, it is necessary to complete recording with a session configuration which includes the lead-in zone, the data zone in which an unrecorded portion does not remain, and the lead-out zone.

In the case of a write-once medium, after user data are written into the data zone, when the session (or the entire disc) is to be closed, an appropriate management method is recorded into the lead-in zone to make it possible for the medium to be reproduced also by another reproduction apparatus as known in the art. In other words, when the disc is not in a closed state, that is, when the disc is in an open state, since appropriate management information is not written in the lead-in zone as yet, the disc does not have the reproduction compatibility at the point of time.

Namely, the reproduction compatibility is obtained by performing a closing process for the disc at a point of time before writing on the disc is not performed newly after necessary writing is completed. After the reproduction compatibility is obtained, the disc does not allow any further writing thereon. On the other hand, when the disc is in an open state, although it does not have the reproduction compatibility as yet, it allows further data writing.

To complete recording with a session configuration which includes the lead-in zone, the data zone in which an unrecorded portion does not remain, and the lead-out zone described above signifies to perform a closing process.

Such a situation as just described gives rise to a problem unique to a write-once disc that, once recording is completed with a session configuration on a disc as a DVD+R, even if the remaining part of the disc is in a non-recorded state, the non-recorded part cannot be utilized any more.

Therefore, a concept of multi-sessions which secure the reproduction compatibility only by modifying an apparatus for exclusive use for reproduction in the minimum has been introduced to moderate the problem of the single session layout that the remaining non-recorded part is wasted.

In the case of a DVD+R, a multi-session disc allows presence of a plurality of sessions up to the 191st session.

Each of the sessions includes

[1] an intro,

[2] a data zone, and

[3] a closure.

One session is enabled for data recording by opening (an opening process) and completed by closing (a closing process).

If a non-recorded data zone remains on the disc, then a session can be added by the opening. At this time, data of an inner side session can be imported logically to the new session. The intro and the closure play rolls similar to those of the lead-in zone and the lead-out zone described hereinabove, respectively. The two regions temporarily store current information while the lead-in zone or information of the lead-in zone is updated, and, since they record the information as ordinary data as an attribute thereof, they have the different names from each other applied thereto.

FIG. 2 shows a multi-session layout.

Referring to FIG. 2, in the information zone, a session 1, a session 2, . . . , and a session N are formed in order from the top in the region from the lead-in zone to the lead-out zone.

The first session 1 includes the lead-in zone, a data zone and a closure.

The session 2 includes an intro, a data zone and a closure

The last session N includes an intro, a data zone and the lead-out zone.

As can be recognized from the comparison with FIG. 1, in the multi-session disc, the top session 1 includes the lead-in zone preceding to the data zone of FIG. 1.

Meanwhile, the last session N includes the lead-out zone following the data zone of FIG. 1.

Further, while it is necessary for one session to complete with a lead-in zone, a data zone and a lead-out zone as described hereinabove, in the case of a multi-session disc, all of the sessions cannot include a lead-in zone and a lead-out zone, and therefore, regions for an intro and a closure are formed in each session.

For example, in the session 1, a closure is formed in place of a lead-out zone. In the session 2, an intro and a closure are formed in place of a lead-in zone and a lead-out zone, respectively. In the last session N, an intro is provided in place of a lead-in zone.

Then, the data zone appearing in FIG. 1 is composed of the data zones from the data zone of the session 1 to the data zone of the session N shown in FIG. 2. Thus, the intros and the closures are included in the data zone appearing in FIG. 1, and this is the reason why the intro and the closure are recorded as ordinary data as an attribute thereof as described hereinabove.

As seen in FIG. 2, the lead-in zone includes an inner disc identification zone.

Meanwhile, the lead-out zone includes an outer disc identification zone.

The intro includes an inner session identification zone.

The closure includes an outer session identification zone.

The zones mentioned are hereinafter referred to collectively as identification zones. In each of the identification zones, information called disc control block (DCB) is recorded.

The disc control block (DCB) is prepared in order to allow addition of recording compatibility information to the configuration on the disc.

The disc control block (DCB) has a general format illustrated in FIG. 3 and includes 16 physical sectors from sector 0 to sector 15. One physical sector is composed of 2,048 bytes.

The first 40 bytes (byte positions D0 to D39) of all of the disc control blocks (DCB) have the same format.

As seen in FIG. 3, the disc control blocks (DCB) include such information as a content descriptor and a drive ID.

Each identification zone allows recording of 16 DCBs in the maximum.

In the DVD+R, a special session DCB (SDCB) is defined as a DCB to be recorded in the outer session identification zone and the inner session identification zone. The SDCB is defined in order to reflect states of a plurality of sessions. The structure of the SDCB of the disc of the present embodiment is hereinafter described with reference to FIG. 11.

The lead-in or the intro of an open session has an SDCB which describes the configuration of the open session and all of the preceding session positions. Then, when the session is closed, the SDCB in the inner identification zone is updated, and one copy of it is recorded into the outer identification zone.

1-2. Two-Layer Disc

Here, as a DVD of a recordable type, a two-layer DVD having two recording layers is considered. The two-layer DVD has a structure wherein two recording layers each in the form of a dye change recording film or a phase change recording film are layered with a comparatively small gap left therebetween.

FIG. 4 schematically shows a disc 1 in a state wherein a layer 0 and another layer 1 are layered as the two recording layers.

Upon recording of such a two-layer disc as just described, a laser beam emitted from an optical pickup 3 of a disc drive apparatus through an objective lens 3a is focused on one of the two recording layers to record a signal on the recording layer.

For a two-layer disc, two recording methods called parallel track path and opposite track path are available.

FIGS. 5A and 5B illustrate the parallel track path recording method.

It is to be noted that, as described hereinabove, the physical sector number PSN is an actual address recorded on a disc surface. In contrast, the logical block address LBA is an address applied to a list of logical data handled by a computer. The PSN and the LBA correspond one by one to each other.

In the parallel track path illustrated in FIG. 5A, each of the layers 0 and 1 includes a lead-in area, a data area and a lead-out area formed from the inner circumference side to the outer circumference side.

Recording of data begins with Start PSN (=30000h) on the inner circumference of the layer 0 and ends with End PSN (0) which is the last end of the data area of the layer 0. Thereafter, recording is performed in order beginning with Start PSN (=30000h) on the inner circumference side of the layer 1 and ending with End PSN (1) on the outer circumference side.

The physical block address LBA is allocated successively in order in the direction from the inner circumference side to the outer circumference side of the layer 0 and then from the inner circumference side to the outer circumference side of the layer 1 as seen in FIG. 5B.

The opposite track path is illustrated in FIGS. 6A and 6B. On a disc to be recorded by the opposite track path recording method, recording is performed in order such that it is recorded toward the last end of the layer 0 beginning with the inner circumference of the layer 0 and is then recorded toward the inner circumference of the layer 1 beginning with the outer circumference of the layer 1.

As seen in FIG. 6A, in the opposite track path, a lead-in area, a data area and a middle area are formed in order from the inner circumference side to the outer circumference side on the layer 0. Further, another middle area, another data area and a lead-out area are formed from the outer circumference side to the inner circumference side on the layer 1.

Recording of data begins with Start PSN (=30000h) on the inner circumference of the layer 0 and is performed up to End PSN (0) which is the last end of the data area of the layer 0. Thereafter, recording of data is performed beginning with the outer circumference side (inverted End PSN (0)) and ending with End PSN (1) on the inner circumference side of the layer 1.

The logical block address LBA is applied successively in order in the direction wherein it is applied successively from the inner circumference side to the outer circumference side of the layer 0 and then applied in a folding back manner from the outer circumference side to the inner circumference side of the layer 1.

In this manner, the parallel track path and the opposite track path are different from each other in the physical storage method (order) of data.

Further, in the opposite track path, a middle area is additionally provided on the outer circumference side with respect to the interlayer folding back portion. This arises from the following reason. In the opposite track path, the lead-in area is formed on the layer 0, and the lead-out area is formed on the layer 1. Therefore, no lead-in area/lead-out area is formed on the outer circumference side with respect to the data area. On the other hand, since an apparatus for exclusive use for reproduction reads pits recorded on the disc surface, in a region which includes no pit, the apparatus cannot read out data stably because no servo control is applied. Therefore, a region for the guard is required. From this requirement, a middle area is formed on the outer circumference side and has, for example, dummy data recorded therein so that a function similar to that of the lead-out area is provided to the middle area.

1-3. Example 1 of Recording of Interlayer Folding Back Position Information

In the discs shown in FIGS. 5A, 5B and 6A, 6B, it is assumed that the data zone (data area) is used fully for recording in a single session configuration.

Here, a two-layer disc as a reproduction-only disc (DVD-ROM, DVD-Video or the like) is described. A reproduction-only disc allows discrimination of an interlayer folding back position from information in the lead-in area (including contents same as those in the lead-in of FIG. 2).

The lead-in area of the DVD system is structured such that, as can be seen from reference to the lead-in area of FIG. 2, a control data zone is provided and has such physical format information as illustrated in FIG. 7 recorded therein.

Referring to FIG. 7, the physical format information is recorded in a region of 2,048 bytes (one sector), and contents of each byte are defined. In particular, such information as a book type and part version, a disc size, a minimum read-out rate, a disc structure, a recording density, a data area allocation and a BCA descriptor is recorded.

In the physical format information, the data area allocation at the byte positions 4 to 15 is defined in such a manner as illustrated in FIG. 8. It is to be noted that FIG. 8 illustrates the data area allocation with regard to a single layer disc, a two-layer disc of the parallel track path and a two-layer disc of the opposite track path.

In the field of the data area allocation, the start sector number of the data area is recorded at the byte positions 5 to 7. At the byte positions 9 to 11, the end sector number of the data area is recorded. They are common to all of the single layer disc, parallel track path disc and opposite track path disc.

At the byte positions 13 to 15, no effective information is recorded on the single layer disc and the parallel track path disc, but the last sector number of the layer 0 is recorded on the opposite track path disc. The last sector number is interlayer folding back position information. A disc drive apparatus grasps the last end position of data in the layer 0 from the information and discriminates that continued data are recorded on the layer 1.

In summary, the reproduction-only single layer disc naturally requires no interlayer folding back position information.

The reproduction-only parallel track path disc has a lead-in area provided on each of the recording layers. The end position of each recording layer can be discriminated by confirming the end sector number of the data area at the byte positions 9 to 11 described hereinabove with reference to FIG. 8 in the lead-in area. Accordingly, since the last end of data in each recording layer can be discriminated, the information of the byte positions 13 to 15 is not required.

In the reproduction-only opposite track path disc, the lead-in area is provided only on the layer 0. Then, the end sector number of the data area at the byte positions 9 to 11 of FIG. 8 represents the address immediately preceding to the lead-out, for example, in the layer 1. Therefore, the interlayer folding back position cannot be discriminated from this information. Therefore, the interlayer folding back position information at the byte positions 13 to 15 is recorded.

A disc drive apparatus can grasp the interlayer folding back position of a two-layer disc as a reproduction-only disc from such information in the lead-in area as described above. Information of the lead-in area of such a structure as described above is adopted also by recordable discs such as a DVD+R disc.

However, where a disc which is of the recordable type such as a DVD+R disc and besides has a plurality of recording layers such as two layers has only such information as described above, it is practically inconvenient.

In particular, in a DVD+R disc or the like, the lead-in area is recorded by a disc closing process performed for a single session disc or by a session closing process of the first session for a multi-session disc.

This is because, with a disc of the recordable type, it is not known in advance what amount of data will be recorded on the disc in the future, and while recording is performed successively, the state of the disc varies every moment. The disc state or the session state is not determined until after a closing process is performed.

Thus, in an open state before the closing process is performed, such information as illustrated in FIG. 8 is not present as effective information in the lead-in area. In other words, even if recording is performed already across layers, as far as the layers remain in an open state, the interlayer folding back position cannot be discriminated.

For example, if it is assumed that a disc which remains in an open state is unloaded from a recording apparatus and loaded into another recording apparatus, then the second recording apparatus cannot grasp the interlayer folding back position and cannot operate normally.

Where the disc is recorded by multi-session recording and allows writing, information in the lead-in area is determined upon a closing process for the first session. Therefore, even if data recording is performed across recording layers in a succeeding session, the information in the lead-in area does not reflect the actual interlayer folding back position. Also in this instance, the disc drive apparatus is placed into a situation in which it cannot discriminate the interlayer folding back position.

Those are described with reference to FIGS. 9A, 9B and 10.

FIGS. 9A and 9B show a disc of the opposite track path as an example.

Referring to FIGS. 9A and 9*b*, reference character "UA" represents a region (Unrecorded Area) in which no pit is present, reference characters "DA1" to "DA12" denote recorded user data, reference character "LI0" denotes the lead-in of the layer 0, "LO1" the lead-out of the layer 1, "MA0" the middle area of the layer 0, and the "MA1" the middle area of the layer 1.

FIG. 9A illustrates a state wherein the user data DA1 to DA12 are recorded sequentially by single session recording. It is assumed that, for example, the user data DA1 to DA10 are recorded on the layer 0, and the user data DA11 to DA12 are recorded on the layer 1.

This state still is a recordable state (open state), and the lead-in area and the lead-out area are not added.

Accordingly, the physical format information described hereinabove with reference to FIGS. 7 and 8 does not exist, and therefore, the interlayer folding back position of data is unknown.

FIG. 9*b* shows a disc layout when the sessions are closed later. By the session closing, also the data area recorded on the surface of the disc is determined, and the lead-in area and the lead-out area are added. It is to be noted that the region of the data area of the layer 1 in which no user data has been recorded is filled with lead-out data (dummy data).

After the state of FIG. 9B is reached, contents of the physical format information described hereinabove with reference to FIGS. 7 and 8 can be referred to and also the interlayer folding back position of data can be known.

After all, if session closing is performed taking reproduction compatibility into consideration, then although the interlayer folding back position can be grasped, the remaining unrecorded part cannot be utilized any more. On the other hand, even if it is tried to assure recording compatibility between apparatus while the disc remains in an open state, recording compatibility cannot be assured inconveniently because the interlayer folding back position is unknown.

While FIGS. 9A and 9B show a two-layer disc of the opposite track path as an example, the description above similarly applies also to a two-layer disc of the parallel track path.

From the foregoing, also in order to assure recording compatibility, it is necessary for the interlayer folding back position to be stored temporarily or permanently somewhere on a recording medium.

Different situations in the case of multi-session recording are described with reference to FIG. 10. In FIG. 10, reference characters "UA", "DA1" to "DA12", "LI0", "MA0" and "MA1" are similar to those of FIGS. 9A and 9B. Further in FIG. 10, reference character "CL1" denotes the closure of the session 1, "CL2" the closure of the session 2, and "IT2" the intro of the session 2.

Figure 10:
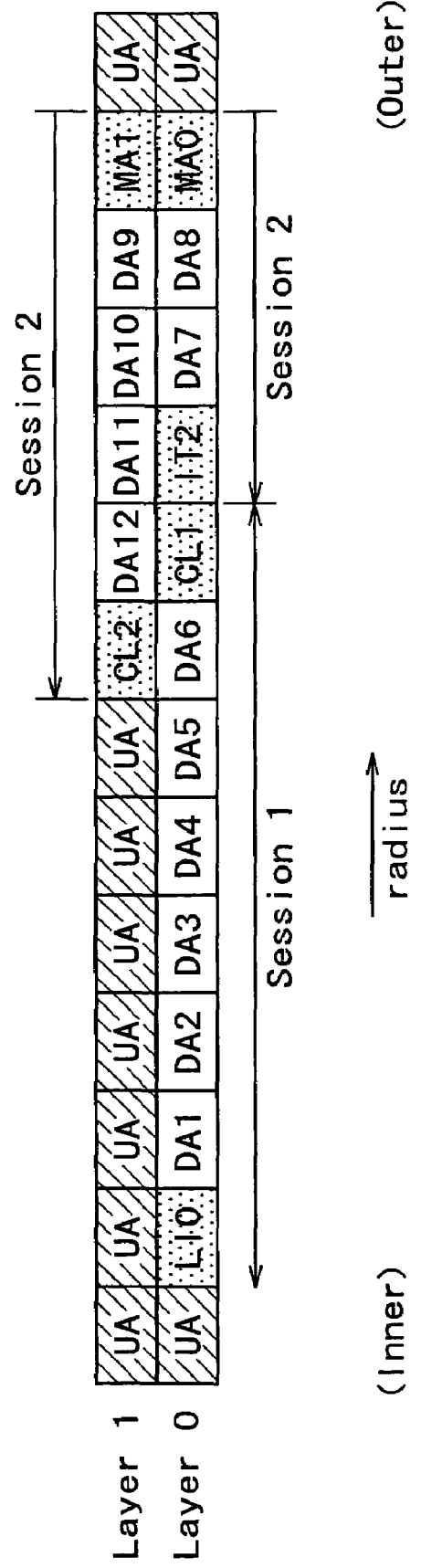
FIG. 10 is a view illustrating a multi-session recorded state on an opposite track path.

FIG. 10 illustrates that user data DA1 to DA6 are recorded as the session 1, and user data DA7 to DA12 are recorded as the session 2. It is assumed that interlayer folding back is performed in the session 2.

In this instance, although the sessions 1 and 2 are closed, a new session or sessions can be added to the disc as a whole. Accordingly, the session 1 is formed from the lead-in area LI0, user data DA1 to DA6 and closure CL1. Meanwhile, the session 2 is formed from the intro IT2, user data DA7 to DA12 and closure CL2.

In this instance, since the lead-in area LI0 is added, the physical format information described hereinabove with reference to FIGS. 7 and 8 exists. However, since information of the entire disc is recorded in the physical format information and is written before the session 2 is recorded, useful information of the interlayer folding back position which accurately reflects the interlayer folding having appeared in the session 2 is not recorded.

According to a disc recognition method of a reproduction apparatus, the lead-in area LI0 is read first to recognize the session 1. Thereafter, the intro IT2 of the session 2 is read in to recognize the session 2. Such a process as just described is repeated to recognize the disc. However, since effective interlayer folding back position information is not recorded in the lead-in area LI0, the interlayer folding back position of the session 2 cannot be grasped.

Taking this into consideration, if the interlayer folding back position information is added to the intro IT2 when the session 2 is closed, then the interlayer folding back position information can be acquired smoothly and conveniently.

Further, it is recognized that it is preferable to have the interlayer folding back position information recorded on the disc before session closing is performed and particularly when a session at which interlayer folding back has occurred on a multi-session disc is closed or the like principally from the two situations described hereinabove with reference to FIGS. 9A, 9B and 10.

It is to be noted that, while a disadvantage arising from the fact that, in the multi-session recording, even if a session is closed (even if the lead-in area of the first session exists), effective interlayer folding back position information does not exist is described with reference to FIG. 10, a disadvantage similar to that described above with reference to FIGS. 9A and 9B may possibly occur also with the multi-session recording. This is because, for example, even if interlayer folding back is performed in a certain session, if the session remains in an open state, then effective information indicative of the interlayer folding back position does not exist.

In the present embodiment, a region in which the interlayer folding back position information can be recorded is prepared in the SDCB described hereinabove.

As described hereinabove with reference to FIG. 2, an identification zone is provided in each of the lead-in area, intro, closure and lead-out area, and a disc control block (DCB) is prepared in the identification zone.

Here, it is described that, in the DVD+R, a session DCB (SDCB) is defined in order to reflect a plurality of session states.

The format of the SDCB in the present embodiment is shown in FIG. 11.

The SDCB extensively defines the DCB of FIG. 3 and accordingly is a region of 16 physical sectors.

As can be seen from comparison with the DCB of FIG. 3, the SDCB of FIG. 11 is similar up to the byte positions D0 to D39 of the physical sector 0 to those of the DCB of FIG. 3.

In the SDCB, a session number is recorded at the byte position D40.

Then, 4 bytes at the byte positions D42 to D45 form a region in which the end sector number in the layer 0 is recorded as the interlayer folding back position information.

It is to be noted that the byte positions D42 to D45 form a region which is defined as reserved (not defined) in the conventional SDCB.

The disc ID is recorded at the byte positions D64 to D95, and predetermined data are corded at the byte positions D96 to D127 in accordance with an application.

At the byte positions D128 et seq., N session items are recorded. A session item is data of a unit of 16 bytes. The session item is hereinafter described.

In the present embodiment, a region in which the interlayer folding back position information is to be recorded is prepared at the byte positions D42 to D45 of the SDCB, and actual effective interlayer folding back position information is recorded in this region in the intro or closure of a session in which the interlayer folding back is performed. In any other session in which the interlayer folding back is not performed, all zeros should be placed at the byte positions D42 to D45.

Since the SDCB is provided in the identification zone in the lead-in area, intro, closure and lead-out area, if the interlayer folding back position information is recorded in the SDCB in a necessary area (the lead-in area, intro, closure or lead-out area) as occasion demands, then the disadvantages described hereinabove with reference to FIGS. 9A, 9B and 10 can be eliminated.

Recording of the interlayer folding back position information in the SDCB is hereinafter described as a process of a disc drive apparatus.

1-4. Example II of Recording of Interlayer Folding Back Position Information

Incidentally, it is considered possible to record the interlayer folding back position information otherwise in the session item in the SDCB similarly. This example is described.

As described hereinabove with reference to FIG. 11, a region in which N session items of a unit of 16 bytes can be recorded is prepared in the SDCB.

In the present example, three types (type 1, type 2 and type 3) are defined for the session items as seen in FIG. 12A. The type 1 and the type 2 are defined already, and the type 3 is information newly defined for recording of the interlayer folding back position information.

The type 1 of the session item is a fragment item. The fragment is a recording unit in one session.

The fragment is described with reference to FIGS. 13A to 13C.

FIG. 13A illustrates a configuration of one session. Referring to FIG. 13A, one session is composed of a lead-in or intro, a data zone and a lead-out or closure as described hereinabove with reference to FIG. 2. The data zone is composed of a plurality of fragments Frag#1 to Frag#n as seen in FIG. 13A. Each of the fragments Frag#1 to Frag#n forms an additional-writing unit in one session. For example, at a point of time before a session is closed, data writing is performed in a unit of a fragment, and at a point of time when writing of one data is completed, that is, when one fragment is formed, an SDCB having the management information for the fragment is written into the identification zone.

As described hereinabove, the identification zone which is a region of 256 sectors allows recording of up to 16 SDCBs each formed from 16 sectors. This signifies that an SDCB can be written (updated) 16 times. FIG. 13B illustrates a state wherein 16 SDCBs SDCB#1 to SDCB#16 in the maximum are recorded in the identification zone. In a state wherein a plurality of SDCBs are recorded in the identification zone, the latest SDCB is regarded as effective information. For example, in the state wherein 16 SDCBs SDCB#1 to SDCB#16 are recorded, the SDCB SDCB#16 is the latest SDCB.

Thus, since one SDCB is recorded (that is, the SDCB is updated) at a point of time when one fragment is recorded, 16 fragments in the maximum can be recorded for one session.

Since one SDCB is recorded at a point of time when one fragment is formed, also at a point of time before the session is closed, it is possible to manage information of fragments recorded already.

For example, referring to FIGS. 13B and 13C, at a point of time when the fragment Frag#1 is recorded first, the first SDCB#1 is recorded in response to the recording. The SDCB#1 includes management information of the fragment Frag#1. Thereafter, when a next fragment Frag#2 is recorded, the SDCB#2 is recorded. The SDCB#2 includes management information of the fragments Frag#1 and Frag#2. The SDCB#1 is rendered ineffective at this point of time.

However, the SDCB is written not only in a corresponding relationship to a fragment, but one SDCB may be additionally recorded in response to some other situation. In FIGS. 13B and 13C, a situation that, for example, an SDCB#3 is recorded from some situation before recording of the fragment Frag#3 is completed is indicated by a broken line. In this instance, at a point of time when the fragment Frag#3 is recorded, an SDCB#4 is recorded.

It is to be noted that, since one SDCB is recorded without fail in response to formation of one fragment, where an SDCB is recorded from some reason other than completion of recording of a fragment Frag like the SDCB#3, the number of fragments Frag which can be formed in the session becomes smaller than 16.

The management information of the Fragment Frag in the SDCB forms the session item of the type 1 described above.

Contents of the type 1 (fragment item) of the session item are illustrated in FIG. 12B.

Referring to FIG. 12B, in the session item of 16 bytes, three bytes at the byte positions 0 to 2 represent a fragment item descriptor. The fragment descriptor has a value indicating that the session item is an item of the "type 1", that is, a fragment item.

A fragment number is recorded in 2 bytes at the byte positions 3 and 4. In particular, the number (one of #1 to #16 in the maximum) of a fragment Frag to which the fragment item corresponds is recorded.

A fragment start address is recorded in 3 bytes at the byte positions 5 to 7. In particular, the start address of the fragment Frag to which the fragment item corresponds is recorded.

A fragment end address is recorded in 3 bytes at the byte positions 8 to 10. In particular, the end address of the fragment Frag to which the fragment item corresponds is recorded.

Since an SDCB corresponding to one fragment includes such a fragment item (session item type 1) as described above, information of the fragment can be managed.

For example, when the SDCB#1 of FIG. 13B is recorded after the fragment Frag#1 of FIG. 13C is recorded, the SDCB#1 includes one fragment item corresponding to the fragment Frag#1.

When the fragment Frag#2 is recorded and then the SDCB#2 is recorded, the SDCB#2 includes two fragment items corresponding to the fragments Frag#1 and Frag#2, respectively.

The type 2 of the session item shown in FIG. 12A is a previous session item. In particular, information of sessions preceding to the current session is indicated. Although detailed description is omitted herein, for example, if the current session is the session #2, then address information and so forth of the session #1 are indicated in the previous session item, and if the current session is the session #5, then address information and so forth of the sessions #1 to #4 are indicated in the previous session item.

The session item type 3 is a layer item for recording interlayer folding back position information therein. Contents of the session item type 3 are illustrated in FIG. 12C.

Referring to FIG. 12C, in the session item of 16 bytes, three bytes at the byte positions 0 to 2 represent a layer item descriptor. The layer item descriptor has a value indicating that the current session item is a "type 3" item, that is, a layer item.

A layer number is recorded in two bytes at the byte positions 3 and 4.

A layer end address is recorded in 3 bytes at the byte positions 8 to 10. The layer end address is an address of the last end of the layer and thus represents interlayer folding back position information.

Also where a session item for recording interlayer folding back position information is prepared as one of session items in this manner, interlayer folding back position information can be recorded in the SDCB.

Since the SDCB is provided in the identification zone in the lead-in area, intro, closure and lead-out area, if the interlayer folding back position information is recorded in the SDCB in a necessary area (the lead-in area, intro, closure or lead-out area) as occasion demands, then the disadvantages described hereinabove with reference to FIGS. 9A, 9B and 10 can be eliminated.

2. Disc Drive Apparatus 2-1. Apparatus Configuration

A disc drive apparatus of a preferred embodiment of the present invention which is ready for the disc 1 (such as a two-layer DVD+R) on which interlayer folding back position information is recorded in an SDCB as in the examples described above is described with reference to FIG. 14.

Figure 14:
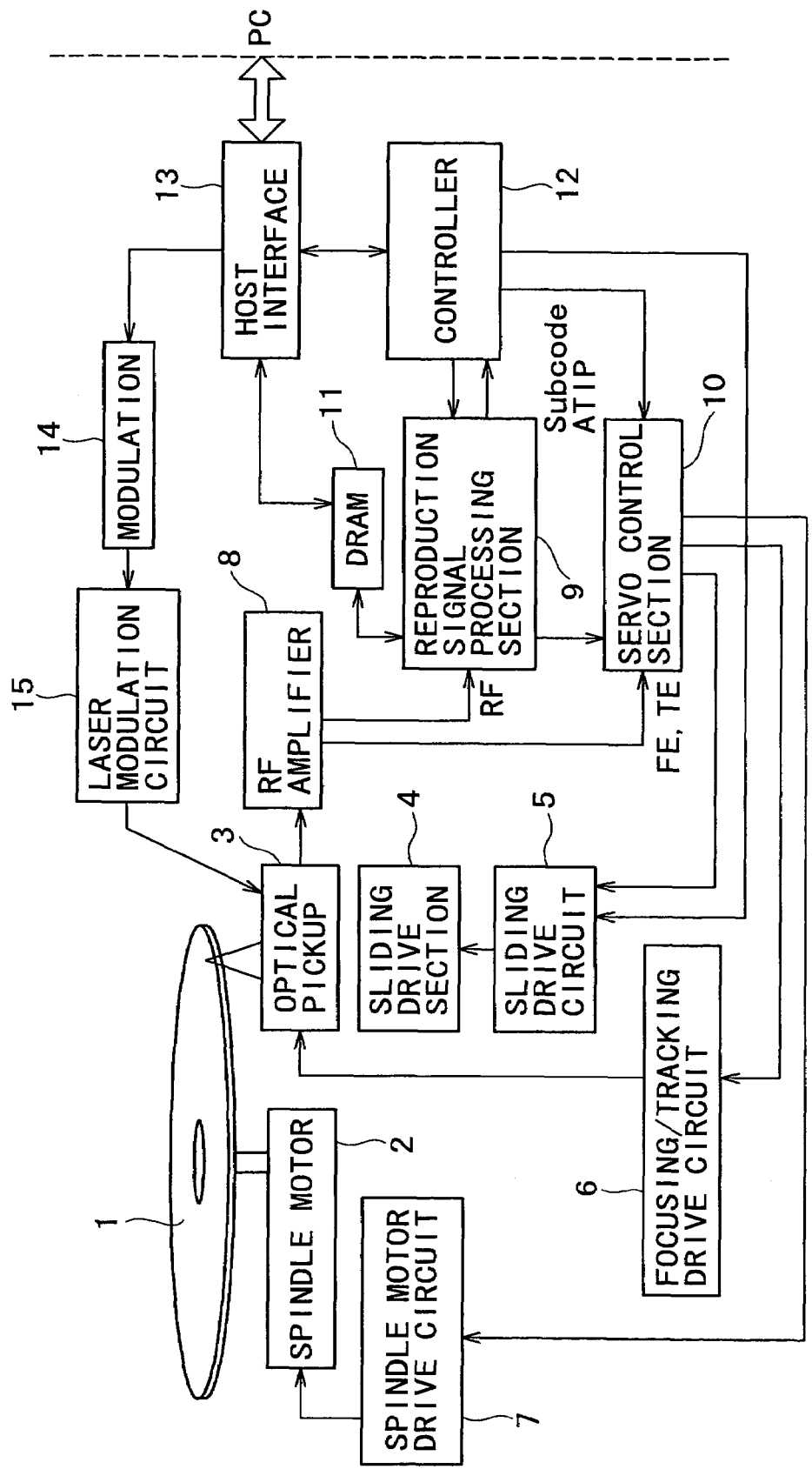
FIG. 14 is a block diagram showing a recording and reproduction apparatus to which the present invention is applied.

FIG. 14 is a block diagram showing part of a disc drive apparatus to which the present invention is applied.

The disc 1 is placed on a turntable not shown and is driven, upon recording or reproduction operation, to rotate at a constant linear velocity (CLV) or a constant angular velocity (CAV) by a spindle motor 2. Then, data recorded in the form of embossed pits, dye change pits or phase change pits on the disc 1 are read out by an optical pickup 3.

Though not shown, the optical pickup 3 has various elements incorporated therein including a laser diode serving as a laser beam source, a plurality of photo-detectors for detecting reflected light, and an objective lens serving as an output end of the laser beam. The optical pickup 3 further includes an optical system for illuminating the laser beam upon a recording surface of the disc 1 through the objective lens and introducing the reflected light from the disc 1 to the photo-detectors, and a two-axis mechanism for carrying the objective lens thereon for movement in an tracking direction and a focusing direction.

Meanwhile, the entire optical pickup 3 is mounted for movement in a radial direction of the disc 1 by a sliding drive section 4.

Reflected light information from the disc 1 is detected and converted into electric signals corresponding to the received amounts of light by the photo-detectors, and the electric signals are supplied to an RF amplifier 8.

The RF amplifier 8 includes a current to voltage conversion circuit for converting output current from each of the photo-detectors in the optical pickup 3 into a voltage, a matrix arithmetic operation/amplification circuit and other necessary circuit elements and produces necessary signals through a matrix arithmetic operation process. The RF amplifier 8 forms, for example, an RF signal representative of reproduction data, and a focusing error signal FE and a tracking error signal TE for servo control.

The reproduction RF signal outputted from the RF amplifier 8 is supplied to a reproduction signal processing section 9 while the focusing error signal FE and the tracking error signal TE are supplied to a servo control section 10.

The reproduction RF signal obtained by the RF amplifier 8 is subject to binarization, PLL clock generation, a decoding process into an EFM+ signal (8-16 modulation signal), an error correction process and so forth in the reproduction signal processing section 9.

The reproduction signal processing section 9 utilizes a DRAM 11 to perform the decoding process and the error correction process. It is to be noted that the DRAM 11 is used also as a cache memory for storage data acquired from a host interface 13 or for transferring data to a host computer not shown.

The reproduction signal processing section 9 cumulatively stores decoded data into the DRAM 11 serving as a cache memory.

As a reproduction output of the disc drive apparatus, the data buffered in the DRAM 11 are successively read out and outputted so as to be transferred.

Further, the reproduction signal processing section 9 extracts, from within information obtained by the EFM+demodulation and the error correction for the RF signal, subcode information, ATIP information, LPP information, ADIP information, sector ID information and so forth and supplies the extracted information to a controller 12.

The controller 12 is formed from, for example, a microcomputer and controls the entire apparatus.

The host interface 13 is connected to an external host apparatus such as a personal computer not shown and communicates reproduction data, read/write commands and so forth with the host apparatus.

In particular, reproduction data stored in the DRAM 11 are outputted and transferred to the host apparatus through the host interface 13.

On the other hand, read/write commands, recording data and other signals are supplied from the host apparatus to the disc drive apparatus and buffered into the DRAM 11 or supplied to the controller 12 through the host interface 13.

When the write command and recording data are supplied from the host apparatus, the disc drive apparatus performs recording on the disc 1.

Upon recording of data, the recording data buffered in the DRAM 11 are processed for recording by a modulation section 14. In particular, addition of error correction codes, EFM+ modulation and so forth are performed for the recording data.

The recording data modulated in this manner are supplied to a laser modulation circuit 15. The laser modulation circuit 15 drives the semiconductor laser in the optical pickup 3 in response to the recording data to output a laser beam in accordance with the recording data thereby to write the recording data on the disc 1.

Upon this recording operation, the controller 12 controls the optical pickup 3 to illuminate the laser beam with a recording power upon the recording region of the disc 1.

Where the disc 1 is of the write-once type wherein a dye change film is used as a recording layer, pits are formed by a dye change by the illumination of the laser beam of the recording power.

On the other hand, where the disc 1 is of the rewritable type wherein a phase change film is used as a recording layer, the crystal structure of the recording layer is changed by heating by the laser beam thereby to form phase change pits on the recording layer. In particular, various data are recorded as presence or absence of a pit and differences in length of such pits. Further, if a laser beam is illuminated again upon a portion of the recording layer at which a pit is formed, then the crystal state changed upon recording of data returns to its original state by heating thereby to eliminate the pits and erase the data.

The servo control section 10 produces various servo drive signals such as focusing, tracking, sliding and spindle servo drive signals from the focusing error signal FE and the tracking error signal TE from the RF amplifier 8, an spindle error signal SPE from the reproduction signal processing section 9 or the controller 12 and so forth so that corresponding servo operations may be executed.

In particular, the servo control section 10 produces a focusing drive signal and a tracking drive signal in response to the focusing error signal FE and the tracking error signal TE and supplies them to a focusing/tracking drive circuit 6. The focusing/tracking drive circuit 6 drives a focusing coil and a tracking coil of the two-axis mechanism of the optical pickup 3. Consequently, a tracking servo loop and a focusing servo loop are formed from the optical pickup 3, RF amplifier 8, servo control section 10, focusing/tracking drive circuit 6 and two-axis mechanism.

It is to be noted that, in order to render the focusing servo operative, a focus search operation must be executed first. The focus search operation is an operation of compulsorily moving the objective lens while the focusing servo is off to detect a position at which an S-shaped curve of the focusing error signal FE is obtained. As well known in the art, a linear region of an S-shaped curve of a focusing error signal is a range within which the position of the objective lens can be pulled in to a focused position by closing the focusing servo loop. Accordingly, while the objective lens is moved compulsorily as a focus search operation, the range within which the pull-in described above is possible is detected, and the focusing servo is rendered operative at the point of time. As a result, a focusing servo operation by which the laser spot is kept in a focused state is achieved.

In the present example, the disc 1 may possibly have a two-layer structure including the layer 0 and the layer 1 as described hereinabove.

However, in order to perform recording or reproduction with respect to the layer 0, the laser beam must be conditioned so as to be focused on the layer 0. On the other hand, in order to perform recording or reproduction with respect to the layer 1, the laser beam must be conditioned so as to be focused on the layer 1.

A shift movement of the focus position between the layers 0 and 1 is performed by a focus jumping operation.

The focus jumping operation is executed such that, while the laser beam is in a focused state on one of the layers, the focusing servo is rendered inoperative and the objective lens is moved compulsorily until it comes to a position within the focus pull-in range to the other layer (until an S-shaped curve is observed), and at the point of time, the focusing servo is rendered operative.

The servo control section 10 further supplies a spindle drive signal produced in response to the spindle error signal SPE to a spindle motor drive circuit 7. The spindle motor drive circuit 7 applies, for example, a three-phase drive signal to the spindle motor 2 in response to the spindle drive signal to rotate the spindle motor 2. The servo control section 10 generates the spindle drive signal further in response to a spindle kick/brake control signal from the controller 12 so that the spindle motor drive circuit 7 executes also such operations as starting, stopping, acceleration and deceleration of the spindle motor 2.

The servo control section 10 further produces a slide drive signal in response to the access execution control of the controller 12 or a slide error signal obtained, for example, as a low frequency band component of the tracking error signal TE and supplies the slide drive signal to a sliding drive circuit 5. The sliding drive circuit 5 drives the sliding drive section 4 in response to the slide drive signal. Though not shown, the sliding drive section 4 includes a mechanism including a main shaft for supporting the optical pickup 3, a thread motor, a transmission gear mechanism and so forth, and when the sliding drive circuit 5 drives the sliding drive section 4 in response to the slide drive signal, a required sliding movement of the optical pickup 3 is performed.

2-2. Session Closing Process

In the disc drive apparatus of the present embodiment, when such interlayer folding back as described above occurs, interlayer folding back position information is recorded on the disc 1.

The recording of interlayer folding back position information is performed, for example, upon session closing or when the disc 1 is ejected while session closing is not performed.

First, a process of recording interlayer folding back position information in a session closing process is described.

Figure 15:
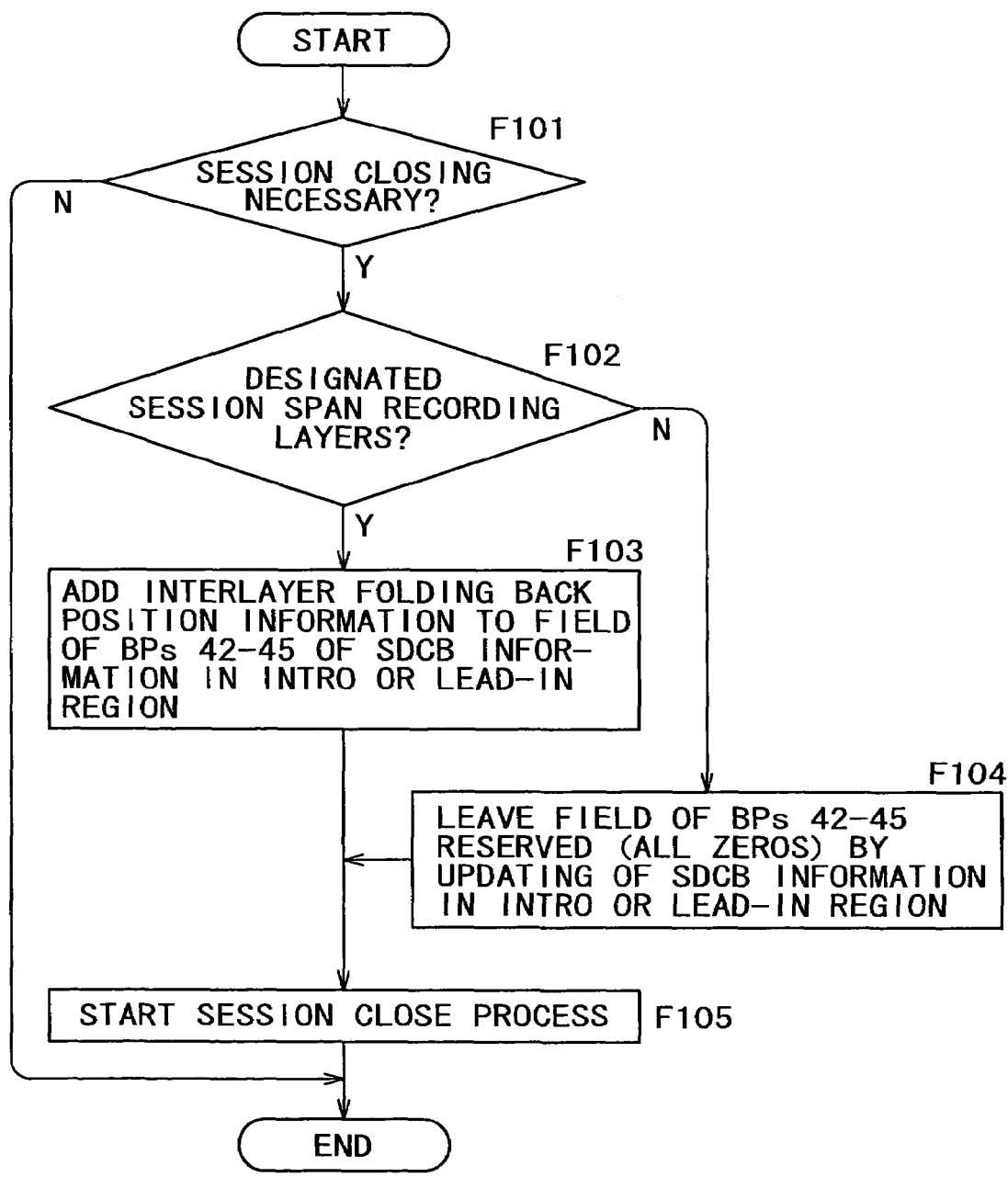
FIG. 15 is a flow chart illustrating a session closing process of the recording and reproduction apparatus of FIG. 14.

FIG. 15 illustrates a process executed by the controller 12 as a session closing process.

For example, when a session closing process is to be performed in response to an instruction from the host apparatus after user data are recorded in such a manner as seen in FIG. 9A or when an instruction to close a certain session is received from the host apparatus in such multi-session recording as illustrated in FIG. 10, the session closing process of FIG. 15 is executed. It is to be noted here that, in the following description, interlayer folding back position information is recorded into the byte positions D42 to D45 of an SDCB.

Referring to FIG. 15, if a session closing instruction (session closing command) is issued from the host apparatus, then the controller 12 discriminates at step F101 of FIG. 15 that session closing is necessary, and then advances the processing to step F102.

At step F102, the controller 12 discriminates whether or not the session of the object of the session closing instruction is recorded spanning recording layers.

If it is discriminated that the session is not recorded spanning recording layers, then the controller 12 advances the processing to step F104, at which the controller 12 writes all zero data into the byte positions D42 to D45 of the SDCB shown in FIG. 11. In other words, the controller 12 writes an SDCB which includes all zero data into the byte positions D42 to D45 thereby to update the SDCB.

On the other hand, if the controller 12 discriminates that the session is recorded spanning recording layers, then the processing advances to step F103, at which the controller 12 records the address of the actual folding back point, that is, interlayer folding back position information, into the byte positions D42 to D45 of the SDCB of FIG. 11. In short, an SDCB having the value of the interlayer folding back position information is written into the byte positions D42 to D45 thereby to update the SDCB.

It is to be noted that, since the disc drive apparatus (controller 12) itself performs data writing on the disc 1, it grasps whether or not interlayer folding back is performed within the session which currently is in an open state and besides the address of the folding back position in a case wherein the interlayer folding back is performed. Therefore, the disc drive apparatus can carry out the processes at steps F102 to F104.

Thereafter, the processing advances to step F105, at which the controller 12 actually executes data writing as a session closing process.

It is to be noted that, in the single session recording, the writing at steps F103 to F105 in the process, that is, recording of the interlayer folding back position information and recording of the session closing, are performed in the lead-in area and the lead-out area in such a manner, for example, as seen in FIG. 9B.

On the other hand, in order to close the first session in the multi-session recording, the writing at steps F103 to F105 is performed in the lead-in area and the closure of the session.

Further, in order to close the last session in the multi-session recording, the writing at steps F103 to F105 is performed in the intro of the session and the lead-out area.

Furthermore, in order to close an intermediate session in the multi-session recording, the writing at steps F103 to F105 is performed in the intro and the closure of the session.

In this manner, if, upon session closing, interlayer folding back is performed within the session, then the interlayer folding back position information is recorded into the SDCB in the session thereby to eliminate the disadvantages described hereinabove with reference to FIG. 10.

It is to be noted that, although it is discriminated at step F102 whether or not the session spans recording layers, it is appropriate for the processing to advance to step F103 also when the data recording reaches the maximum recording range (last end of the data zone of FIG. 1) in a session of the layer 0 in the multi-session recording. In particular, when a next session is recorded, the recording is performed for the layer 1 without fail, and since the boundary of the session becomes an interlayer folding back point, it is appropriate to record the position as an interlayer folding back position on the disc.

Further, although it is described above that the interlayer folding back position information is recorded at the byte positions D42 to D45 of the SDCB, also where the session item type 3 (layer item) in the SDCB is used to record the interlayer folding back position information, the process of FIG. 15 can be applied similarly.

2-3. Process Upon Ejection

Now, a process upon ejection is described with reference to FIG. 16.

Figure 16:
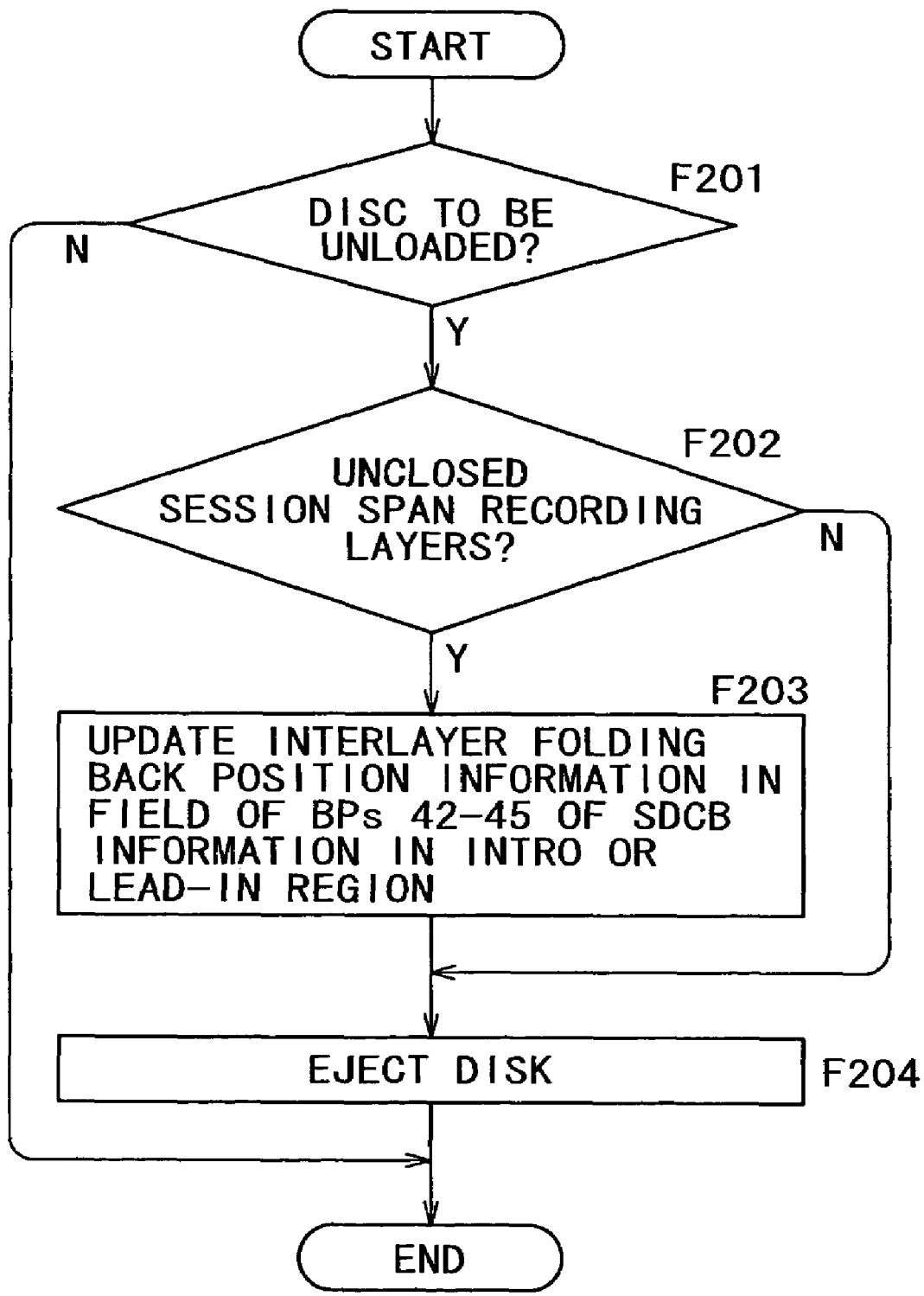
FIG. 16 is a flow chart illustrating an SDCB updating process upon ejection of the recording and reproduction apparatus of FIG. 14.

The process illustrated in FIG. 16 is executed, for example, when the user performs an ejection operation of the disc drive apparatus in order to unload the disc 1 while no session closing instruction is issued from the host apparatus. In other words, the process is executed when the user tries to unload the disc 1 without performing a session closing operation.

If a disc unloading request is detected at step F201, then the processing of the controller 12 advances to step F202.

The disc unloading request may be an eject command issued from the host apparatus to the disc drive apparatus or a depression operation by the user of an eject button provided on the disc drive apparatus.

When the processing advances to step F202 in response to a disc unloading request, the controller 12 discriminates whether or not a session which is not closed as yet remains on the disc 1. If a session which is not closed as yet remains on the disc 1, then the controller 12 discriminates whether or not recorded data span the recording layers.

If data are not recorded spanning the recording layers, then the processing advances to step F204, at which the controller 12 performs disc unloading control. In other words, the disc 1 is unloaded while the disc 1 is in a session open state.

On the other hand, if it is discriminated at step F202 that data are recorded spanning the recording layers, then the processing advances to step F203.

At step F203, the controller 12 updates only the SDCB in the session without performing a session closing operation. In particular, the controller 12 records an SDCB in which an address of the actual folding back point, that is, interlayer folding back position information, is recorded at the byte positions D42 to D45 illustrated in FIG. 11 thereby to update the SDCB.

Then, the controller 12 performs the disc unloading process at step F204, whereafter it ends the processing. In short, although the session remains in an open state, the disc 1 is unloaded with the interlayer folding back position information recorded thereon.

It is to be noted that, in single session recording or when an ejection request is issued while the first session remains open in multi-session recording, the writing executed at step F203, that is, the SDCB updating for recording of the interlayer folding back position information, is performed in the identification zone in the lead-in area.

Further, when an ejection request is issued while a certain session from among the second and succeeding sessions remains open in multi-session recording, the writing executed at step F203, that is, the SDCB updating for recording of the interlayer folding back position information, is performed in the identification zone in the intro of the session.

In the format in the DVD system of the recordable type, it is prescribed that, when a DCB (including an SDCB) is updated, another DCB for replacement is recorded immediately next to a DCB recorded last. Further, it is prescribed that, if a plurality of DCBs having the same content descriptor exist, only that one of the DCBs which has the highest address number is valid.

Accordingly, even with a write-once medium, there is no problem to update an SDCB within a region of the lead-in area or an intro before session closing.

In this manner, if, upon ejection, interlayer folding back is performed within a session which is in an open state, then interlayer folding back position information is recorded into the SDCB in the session, and the disadvantages described hereinabove with reference to FIG. 9 are eliminated.

It is to be noted that, although it is discriminated at step F202 whether or not a session which is not in a closed state spans the recording layers, further it is appropriate for the processing to advance to step F203 also when the data recording of the session of the layer 0 which is not in a closed state reaches the maximum recording range (last end of the data zone of FIG. 1) irrespective of multi-session recording or single session recording. In particular, when additional recording to the session is performed or when the session is closed and a next session is recorded, the recording is performed for the layer 1 without fail, and since the boundary of the session becomes an interlayer folding back point, it is appropriate to record the position as an interlayer folding back position on the disc.

Further, although it is described above that the interlayer folding back position information is recorded at the byte positions D42 to D45 of the SDCB, also where the session item 3 (layer item) in the SDCB is used to record the interlayer folding back position information, the process of FIG. 16 can be applied similarly.

2-4. SDCB Updating Process Upon Occurrence of Interlayer Folding Back

Now, an SDCB updating process upon occurrence of interlayer folding back is described with reference to FIG. 17.

The SDCB updating process is a process of recording, during recording operation, an SDCB including interlayer folding back position information at a point of time at which advancement of the recording point from the layer 0 to the layer 1 occurs.

It is to be noted that the following description is directed to an example wherein the session item type 3 of the SDCB is used to record interlayer folding back position information.

Figure 17:
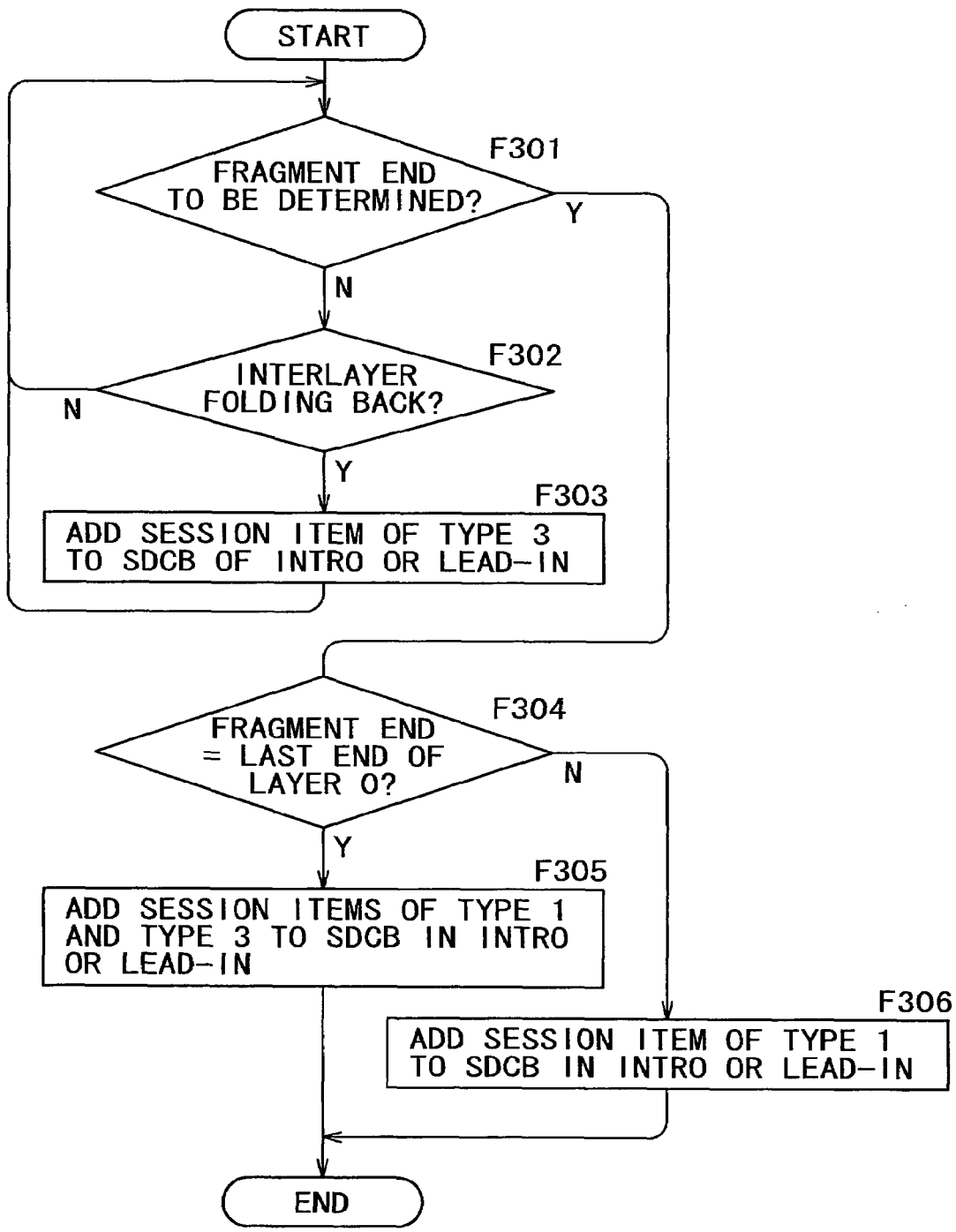
FIG. 17 is a flow chart illustrating an SDCB updating process upon occurrence of an interlayer folding back of the recording and reproduction apparatus of FIG. 14.

The controller 12 supervises, as a process relating to updating of an SDCB, determination of a fragment end at step F301 of FIG. 17 during data recording.

As described hereinabove, as a result of data recording in the data zone, it is necessary to update the SDCB at a point of time when recording of one fragment is completed. Therefore, the discrimination at step F301 is supervision of an SDCB updating timing at completion of recording of the fragment.

Then at step F302, occurrence of interlayer folding back is supervised. In other words, advancement of the recording operation from the layer 0 to the layer 1 is supervised. It is to be noted that interlayer folding back may possibly occur not only when the recording operation reaches the maximum recording range (last end of the data zone of FIG. 1) of the layer 0 but also when the recording on the layer 0 comes to an end before the maximum recording range is reached and the recording operation advances to the layer 1. In what condition interlayer folding back should be performed depends upon an application from which an instruction of operation of the disc drive apparatus is issued.

If it is discriminated at step F302 that interference folding back occurs during recording operation, then the controller 12 advances the processing to step F303, at which the controller 12 updates the SDCB so as to add the session item type 3 (layer item). The layer item (refer to FIG. 12C) includes an address as the interlayer folding back position information.

The process described above is described below with reference to FIGS. 18 and 13(a) to 13(c).

Figure 18:
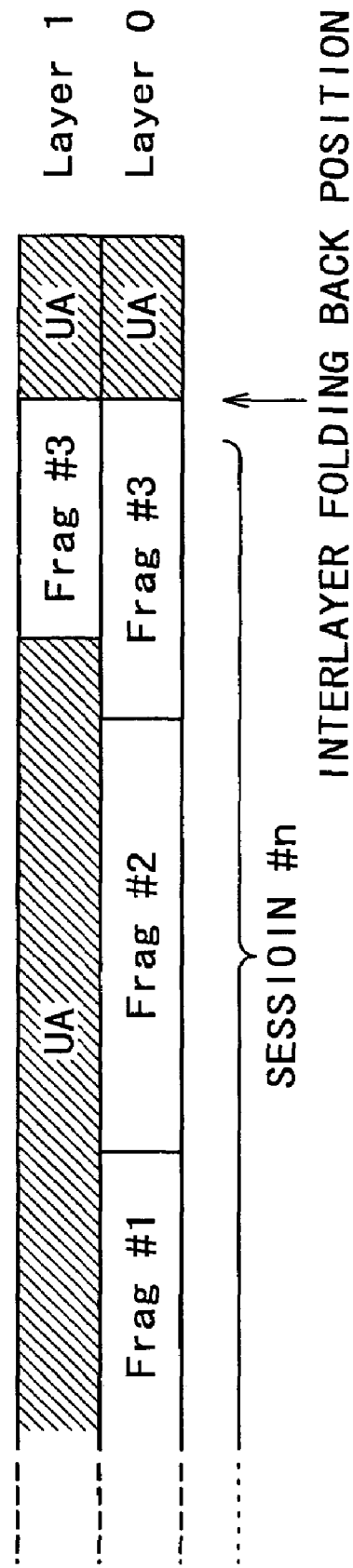
FIG. 18 is a diagrammatic view illustrating an SDCB updating process upon occurrence of an interlayer folding back of the recording and reproduction apparatus of FIG. 14.

It is assumed that fragments Frag#1 and Frag#2 are formed already in a certain session as seen in FIG. 18 and a further fragment Frag#3 is currently recorded on the layer 0.

At a point of time prior to the recording of the fragment Frag#3, the SDCBs #1 and #2 illustrated in FIG. 13B are recorded already, and the SDCB#2 is valid.

The discrimination of occurrence of interlayer folding back at step F302 is made at a point of time, for example, when the data recording of the fragment Frag#3 reaches the interlayer folding back point of FIG. 18 (and it is to be subsequently started to continue recording on the layer 1). At this point of time, the recording of the fragment Frag#3 is not completed as yet.

Here, the processing of the controller 12 records an SDCB including the interlayer folding back position information at step F303. For example, an SDCB#3 of FIG. 13B is recorded.

The SDCB#3 is the latest valid SDCB which includes, as session items, fragment items corresponding to the fragments Frag#1 and Frag#2 and a layer item in which the interlayer folding back position information is recorded.

It is to be noted that, at the point of time at which the processing of the controller 12 advances to step F302 or F303, the recording of the fragment is not completed as yet. Therefore, the recording of the fragment is further continued.

For example, if it is assumed that recording of the fragment Frag#3 is performed also on the layer 1 and then is completed as seen in FIG. 18, then the processing of the controller 12 advances from step F301 to step F304.

At step F304, it is discriminated whether or not the last end of the current fragment is the last end of the layer 0, and the processing of the controller 12 branches depending upon the discrimination.

If the fragment Frag#3 is being recorded in the example of FIG. 18, then since the last end of the fragment Frag#3 is not the last end of the layer 0, the processing advances to step F306.

At step F306, the controller 12 performs updating of the SDCB in accordance with an end of recording of a fragment. In particular, in the example of FIG. 18, the controller 12 updates the SDCB so as to add a corresponding session item type 1 (fragment item) to the fragment Frag#3. For example, the controller 12 writes an SDCB#4 of FIG. 13B.

In the example of FIGS. 18 and 13A to 13C, the SDCB#4 written at step F306 becomes the latest valid SDCB in which fragment items corresponding to the fragments Frag#1, Frag#2 and Frag#3 and a layer item in which the interlayer folding back position information is recorded are included as session items.

It is to be noted that the case wherein the last end of a fragment is discriminated as the last end of the layer 0 at step F304 is a case wherein additional recording to the session (recording of a next fragment) is performed later or another case wherein the session is closed and a next session is recorded, and in both cases, subsequent recording is performed inevitably on the layer 1.

In short, in the present example, both of occurrence of interlayer folding back and completion of recording of a fragment are determined as SDCB updating timings as at steps F303 and F306 as described above, and the case wherein the last end of a fragment becomes the last end of the layer 0 is a case wherein an SDCB updating timing by occurrence of interlayer folding back and an SDCB updating timing by completion of recording of a fragment become coincident witch other.

In this instance, the processing of the controller 12 advances to step F305, at which the controller 12 performs updating of the SDCB. In this instance, however, the controller 12 updates the SDCB so as to add a session item type 1 (fragment item) corresponding to the current fragment and a session item type 3 (layer item) in which the interlayer folding back position information is recorded.

It is to be noted that, where the process of FIG. 17 is performed in single session recording or upon recording in the first session in multi-session recording, the recording of an SDCB executed at steps F303, F305 and F306 is performed for the identification zone in the lead-in area.

On the other hand, where the process of FIG. 17 is performed upon recording in a certain session from among the second and following sessions in multi-session recording, the recording of an SDCB executed at steps F303, F305 and F306 is performed for the identification zone in the intro of the session.

In the example of the process of FIG. 17, when the recording point from one to the other of the recording layers, the interlayer folding back position information is recorded in the SDCB.

In short, the time lag between the occurrence of interlayer folding back and the recording of the interlayer folding back position information is shortest. That the time lag is shortest in this manner is most safe for the assurance of the interlayer folding back position. This is because, even if interruption of power supply or the like occurs within a period before later session closing or ejection is performed, the interlayer folding back position information is secured on the disc 1.

It is to be noted that, since, in the process of FIG. 17, the SDCB is updated at a point of time when user data recording on the layer 0 is completed and then user data recording on the layer 1 is started, interruption of the user data recording and accessing of the optical pickup 3 are required additionally in the recording operation. If the situation is such that the additional requirement is not preferable, then the process of FIG. 15 or 16 may be executed appropriately.

Incidentally, while the example of the process of FIG. 17 is described in connection with an example wherein the session item type 3 (layer item) in the SDCB is used to record interlayer folding back position information, the example of the process of FIG. 17 can be adopted also where interlayer folding back position information is recorded into the byte positions D42 to D45 of the SDCB.

3. Modifications

While the preferred embodiment of the present invention is described above, various modifications and applications are possible with the present invention.

While it is described above that interlayer folding back position information is recorded at such specific timings as upon session closing processing, upon ejection and upon occurrence of interlayer folding back, it may be performed at some other different timings.

For example, interlayer folding back position information may be recorded in response to a command from the host apparatus. As the command from the host computer, a command which designates a particular address as an interlayer folding back address may be issued before or during user data recording. If the interlayer folding back address is specified by such a command as just described, then recording of interlayer folding back position information (for example, such a process as at step F103, F203, F303 or F305 described hereinabove) may be executed at a predetermined point of time. Naturally, where such a command as described above is issued before or during user data recording and interlayer folding back is performed in response to the command, such a process as described above with reference to FIG. 17 may be performed to record the interlayer folding back position information.

However, it is otherwise possible to generate, as a command from the host computer, a command for directly instructing for recording of interlayer folding back position information. In short, not such a command to "designate an interlayer folding back position" but a command to "record interlayer folding back position information" is used. The controller 12 may perform, in response to the command to "record interlayer folding back position information", for example, the processes at steps F102 to F104 of FIG. 15 or the processes at steps F202 to F203 of FIG. 16.

Also it is possible to record interlayer folding back position information in response to an instruction regarding interlayer folding back from the host apparatus as in the cases described above.

The processes illustrated in FIGS. 15, 16 and 17 and the recording process of interlayer folding back position information which is performed in response to an instruction from the host apparatus as described above can be applied similarly to both of a disc of the opposite track path and a disc of the parallel track path.

Further, while, in the foregoing description of the embodiment, a DVD+R is taken as an example of a two-layer recordable DVD type disc, also two-layer discs in the form of a DVD-R, a DVD+RW, a DVD-RW and a DVD-RAM can be suitably used similarly to record interlayer folding back position information as described above.

Further, the region into which interlayer folding back position information is to be recorded is not limited to the byte positions D42 to D45 of the SDCB or the region of a session item, but may be set to any suitable position. In particular, the region may be set within the SDCB or may be some other region. Further, the interlayer folding back position information is not limited to information of 4 bytes or 3 bytes.

For example, the DVD-R/RW has a region called RMD (Recording Management Data), and interlayer folding back position information may be recorded in such a region from Field13 to Field14 of the RMD.

Further, it is effective to record interlayer folding back position information not only on discs of the DVD type but also on various other recording media having a plurality of recording layers such as discs of other types such as discs of the CD type and discs of the blue ray disc type and various media other than disc media. In such recording media as mentioned above, the recording region may be determined suitably based on the data format used therefor.

Further, while, in the embodiment described above, the disc is a two-layer disc, naturally the present invention can be applied suitably also to those recording media which have three or more recording layers.

While a preferred embodiment of the present invention has been described using specific terms, such description is for illustrative purposes only, and it is to be understood that changes and variations may be made without departing from the spirit or scope of the following claims.

What is claimed is:

1. A recording apparatus for recording/reproducing data to/from a recording medium, which has a plurality of recording layers configured to record data, each of which includes a data area configured to record main data, a preceding area which is formed at a position preceding said data area, and an end area succeeding said data area, comprising:

a recording unit configured to record information on any of the recording layers; and a control unit configured to control a recording operation by said recording unit so that when data recording advances on a certain one of said recording layers and reaches a maximum recording range or data recording advances from a certain one of said recording layers to a next one of said recording layers, said recording unit is controlled to record interlayer folding back position information indicative of a position to which the data recording advances into a predetermined region on the recording medium.

2. A recording apparatus according to claim 1, wherein, when a certain session formed on the recording medium by the recording operation of said recording unit is to be closed, if advancement of the data recording from certain one of the recording layers to the next one of the recording layers is performed within the session, then said control unit controls said recording unit to record the interlayer folding back position information.

3. A recording apparatus according to claim 1, wherein, when the recording medium on which the recording operation has been performed is to be unloaded, if advancement of the data recording from the certain one of the recording layers to the next one of the recording layers is performed within a session on the recording medium, which is not yet closed, then said control unit controls said recording unit to record the interlayer folding back position information.

4. A recording apparatus according to claim 1, wherein, when advancement of the data recording by the recording operation of said recording unit from the certain one of the recording layers to the next one of the recording layers is performed, then said control unit controls said recording unit to record the interlayer folding back position information.

5. A recording apparatus according to claim 1, wherein said control unit controls said recording unit to record the interlayer folding back position information in response to an instruction from an external host apparatus.

6. A recording apparatus according to claim 1, wherein said control unit controls said recording unit to record the interlayer folding back position information into a predetermined region in the data area of the recording medium into which management information of a session is recorded.

7. A recording apparatus according to claim 1, wherein said control unit controls said recording unit to record the interlayer folding back position information into a predetermined region in the preceding area or the end area of the recording medium into which management information of a session is recorded.

8. A recording method for recording on a recording medium, which has a plurality of recording layers configured to record data, each of which including a data area configured to record main data, a preceding area formed at a position preceding said data area, and an end area succeeding said data area, comprising:

recording information on any of the recording layers; and controlling the recording, in response to data recording advances on a certain one of the recording layers reaching a maximum recording range or data recording advances from a certain one of the recording layers to a next one of the recording layers during the recording, so that interlayer folding back position information indicative of a position to which the data recording advances is recorded into a predetermined region on the recording medium.

9. A recording method according to claim 8, wherein the controlling is executed if, when a certain session formed on the recording medium by the recording is to be closed, advancement of the data recording from the certain one of the recording layers to the next one of the recording layers is performed within the session.

10. A recording method according to claim 8, wherein the controlling is executed if, when the recording medium on which a recording operation has been performed by the recording is to be unloaded, advancement of the data recording from the certain one of the recording layers to the next one of the recording layers is performed within a session on the recording medium, which is not yet closed.

11. A recording method according to claim 8, wherein the controlling is executed when advancement of the data recording by a recording operation at the recording from the certain one of the recording layers to the next one of the recording layers is performed.

12. A recording method according to claim 8, wherein the controlling is executed in response to an instruction from an external host apparatus.

* * * * *